United States Patent
Bates et al.

[11] Patent Number: 5,966,512
[45] Date of Patent: Oct. 12, 1999

[54] GROUPWARE SAVE OPERATION

[75] Inventors: Cary Lee Bates, Rochester; Jeffrey Michael Ryan, Byron, both of Minn.

[73] Assignee: International Business Machines Corporation, Armonk, N.Y.

[21] Appl. No.: 08/870,076

[22] Filed: Jun. 5, 1997

[51] Int. Cl.[6] .................................................. G06F 15/167
[52] U.S. Cl. .............................. 395/200.35; 395/200.34; 395/200.31; 345/331; 711/152
[58] Field of Search ......................... 395/200.31, 200.81, 395/200.43, 200.35, 200.34, 676, 331, 330; 711/147, 150, 159, 152; 707/10, 101, 104, 512, 511, 521, 515, 103

[56] References Cited

U.S. PATENT DOCUMENTS

| | | | |
|---|---|---|---|
| 5,220,657 | 6/1993 | Bly et al. ................................. | 711/152 |
| 5,337,407 | 8/1994 | Bates et al. ............................. | 395/153 |
| 5,339,388 | 8/1994 | Bates et al. ............................. | 395/153 |
| 5,339,389 | 8/1994 | Bates et al. ............................. | 395/153 |
| 5,515,491 | 5/1996 | Bates et al. ............................. | 395/155 |
| 5,533,183 | 7/1996 | Henderson, Jr. et al. ............. | 345/344 |
| 5,583,993 | 12/1996 | Foster et al. ....................... | 395/200.35 |
| 5,689,641 | 11/1997 | Ludwig et al. ..................... | 395/200.71 |
| 5,754,782 | 5/1998 | Masada ............................... | 395/200.43 |
| 5,758,347 | 5/1998 | Lo et al. ............................... | 707/103 |
| 5,799,191 | 8/1998 | Moriyasu et al. ..................... | 395/682 |
| 5,802,322 | 9/1998 | Niblett ............................... | 395/200.81 |

*Primary Examiner*—Mehmet B. Geckil
*Attorney, Agent, or Firm*—Owen J. Gamon

[57] ABSTRACT

A collaborative-processing system editor that associates changes made to a shared object with the user who made them, such that the user can save and discard just those changes without affecting the changes made by others while still allowing all users to simultaneously view the changes that others make. The system manages sets of change regions that identify portions of the object for which a user has entered changes. As the user enters changes for the shared object, the system establishes pre-commit records associated with change regions. The pre-commit records include the change data entered by the user but not yet saved or committed to the shared object. The system displays a simultaneous view of the shared object and the pre-commit changes to all users. This simultaneous view is of the shared object and the pre-commit changes as they would appear if they had already been saved to the shared object. When the user requests that the pre-commit changes be saved, the system saves only the pre-commit changes for that user without saving changes entered by other users to the shared object. When the user requests that the pre-commit changes be discarded, the system discards only the pre-commit changes for that user without discarding changes entered by others users.

37 Claims, 20 Drawing Sheets

FIG. 4

| DOCUMENT | |
|---|---|
| File | Change Options |
| | Immediate |
| | Allow Changes |
| | Don't Allow Changes |

§ 103. Conditions for subject matter

A patent may not be obtained though the invention is not identically disclosed or described as set forth in section 102 of this title, if the differences between the subject matter sought to be patented and the prior art are such that the subject matter as a whole would have been obvious at the time the invention was made to a person having ordinary skill in the art to which said subject matter pertains. Patentability shall not be negatived by the manner in which the invention was made.

GROUPWARE SAVE OPERATION

FIELD OF THE INVENTION

The present invention relates to data processing system. More particularly, this invention relates to the saving of changes to an edited shared-data object in a groupware environment.

BACKGROUND

Groupware, which is also sometimes called collaborative computing or collaborative information-processing, generally involves specialized, computer technology that is designed to promote efficiency by coordinating individual efforts within a group toward completion of a common task. The task that is the subject of the group's attention may be a shared-data object such as a document, a book, a production schedule, a computer program, a product design, or any other task that is represented by the organized expression of information. Construction of that expression is aided by the efforts of the group's multiple users and particularly by their simultaneous efforts.

A good example of this simultaneous construction is in the joint production of a new textbook. Multiple users simultaneously work together to make changes and available changes and additions, which can be in the form of text, graphics, and photographs, to each member of the production team, and informs all team members of the changes and additions so that they can best coordinate their joint efforts.

A computer network is typically the vehicle for coordinating the users' work with each user operating at a computer in the network. The subject of the work is often structured as one or more shared-data objects stored in memory accessible over the network. A shared-data object is one that is simultaneously accessible to multiple users over the network. Such data objects can include, for example, word-processing documents, design drawings, and spreadsheets. Users access the shared-data object via a groupware tool, such as a text-editor or data-base management facility.

A user accesses shared-data objects through the multi-user interface provided by the groupware tool. The interface typically includes a video monitor under the control of the user's local workstation, through which views of the shared-data objects are displayed. The interface is supported by software, allowing multiple simultaneous access to an object with the right to manipulate the contents of the object. Identical characteristics of one category of multi-user interface are referred to as the "What You See Is What I See" (WYSIWIS) concept. In split form, each user sees exactly the same thing, from the same view point, with each user being given apparent immediate rights to manipulate the shared object. The groupware tool transmits updates to each participant, allowing the participants to see what the group is doing as they do it.

A problem can arise when a user decides to save changes to the shared-data object. Since there is only one image of the shared-data object that multiple users are working on, when one user saves the object, all the changes made to the object (no matter which user made them) are saved. This means that some users may have made changes that they had no intention of saving, yet if another user performs a save operation, then the unintended changes will be saved anyway (perhaps without the maker of the changes even realizing it.)

Prior groupware tools typically provided two options upon exiting the tool: save-and-exit and exit-with-no-save. Unfortunately, even if the exiting user chooses exit-with-no-save, if other users are still accessing the shared-data object, then the changes the first user made are still present in the object, and will be made permanent if another user chooses to exercise the save-and-exit option.

Therefore, there is a need in collaborative processing to provide the user with the ability to save and discard that user's changes without affecting the changes made by others while still allowing all users to see the group's changes.

SUMMARY OF THE INVENTION

It is therefore one object of the present invention to provide an improved method and system for data processing.

It is another object of the present invention to provide an improved data--processing system and method for collaborative editing.

It is another object to provide an improved system and method for multiple users to edit a shared data object.

It is another object to provide a system and method for one user to commit just that user's changes to the shared data object without committing changes entered by other users.

These and other objects are achieved in the preferred embodiment by a collaborative-processing system that associates changes made to a shared object with the user who made them, such that the user can save and discard just those changes without affecting the changes made by others while still allowing all users to simultaneously view the changes that others make. The system manages sets of change regions that identify portions of the object for which a user has entered changes. As the user enters changes for the shared object, the system establishes pre-commit records associated with change regions. The pre-commit records include the change data entered by the user but not yet saved or committed to the shared object. The system displays a simultaneous view of the shared object and the pre-commit changes to all users. This simultaneous view is of the shared object and the pre-commit changes as they would appear if they had already been saved to the shared object. When the user requests that the pre-commit changes be saved, the system saves only the pre-commit changes for that user without saving changes entered by other users to the shared object. When the user requests that the pre-commit changes be discarded, the system discards only the pre-commit changes for that user without discarding changes entered by others users.

BRIEF DESCRIPTION OF THE DRAWINGS

FIG. 4 depicts a pictorial representation of a user interface for the preferred embodiment.

DESCRIPTION OF THE PREFERRED EMBODIMENT

In the preferred embodiment, a collaborative-processing system associates changes made to a shared object with the user who made them, such that the user can save and discard just those changes without affecting the changes made by others while still allowing all users to simultaneously view the changes that others make. The system manages sets of change regions that identify portions of the object for which a user has entered changes. As the user enters changes for the shared object, the system establishes pre-commit records associated with change regions. The pre-commit records include the change data entered by the user but not yet saved or committed to the shared object. The system displays a simultaneous view of the shared object and the pre-commit changes to all users. This simultaneous view is of the shared object and the pre-commit changes as they would appear if they had already been saved to the shared object. When the user requests that the pre-commit changes be saved, the system saves only the pre-commit changes for that user without saving changes entered by other users to the shared object. When the user requests that the pre-commit changes be discarded, the system discards only the pre-commit changes for that user without discarding changes entered by others users.

Figure 1:
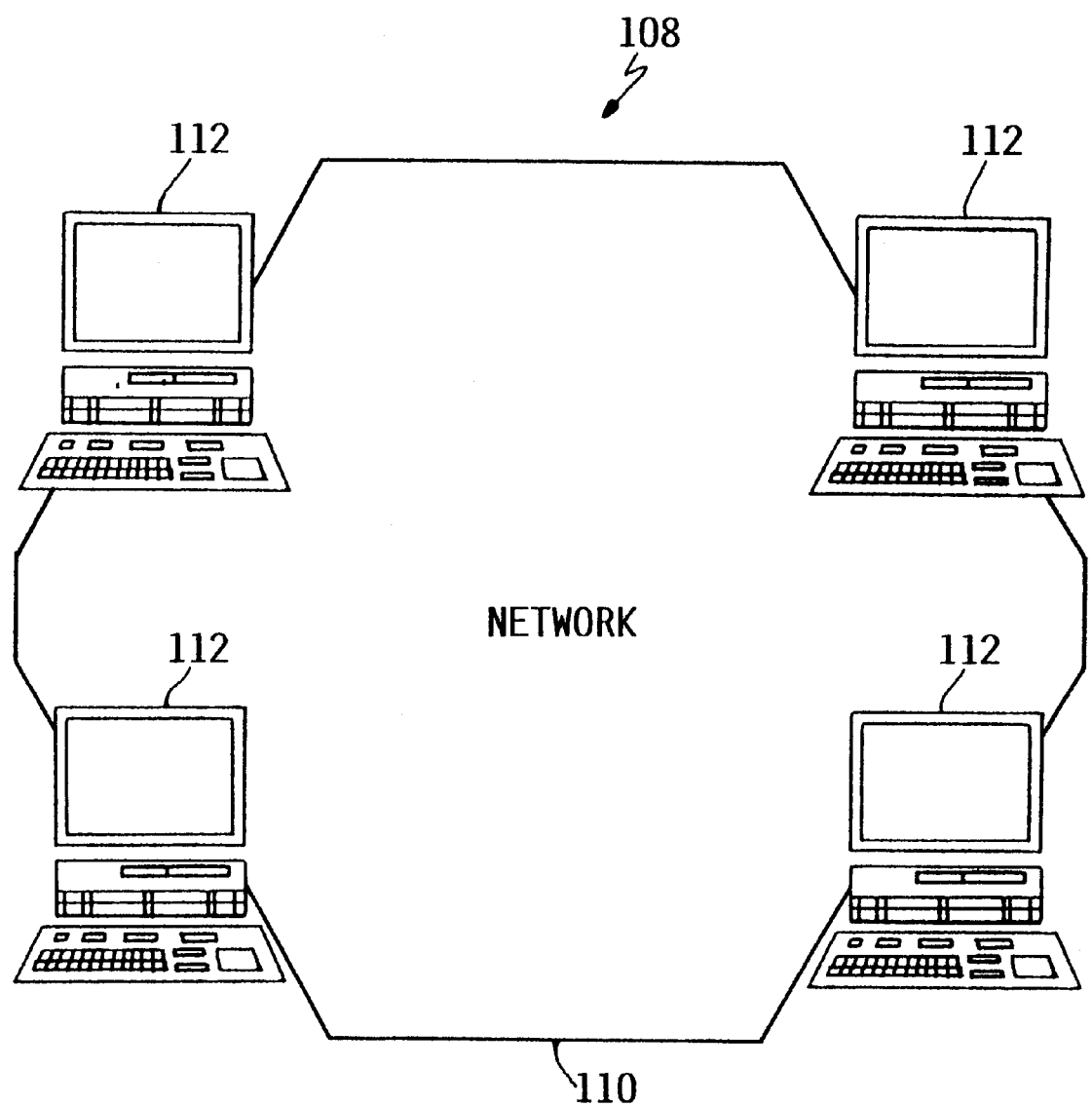
FIG. 1 illustrates a pictorial representation of a network within which the preferred embodiment is advantageously employed.

With reference now to the figures and in particular to FIG. 1, there is depicted a pictorial representation of network 108, which may be utilized in accordance with the method of the preferred embodiment. Network 108 supports a collaborative, computer-based, editing system related to a shared-data object stored on a server. Network 108 provides data communication over a transmission channel 110 between a plurality of computers 112. In the preferred embodiment, network 108 is a local-area-network (LAN), but network 108 is not restricted to being a LAN and could be of any type, including an Intranet or the Internet. Transmission channel 110 could be wires, cables, transmission lines, telephone connections, or wireless communications. Computers 112 within the depicted system are preferably provided by utilizing an IBM personal computer, although they could be any other type of computer system. Computers 112 generally include a keyboard for receiving user input and a video-display device to send messages to the user. One of the computers 112 operates as a server for network 108. The server may, for example, be a larger computer such as the IBM Application System/400. While a particular hardware configuration is described herein along with various alternatives, the editing methods described could in general be practiced using any hardware configuration that allows multiple users to simultaneously accessing an object.

Figure 2A:
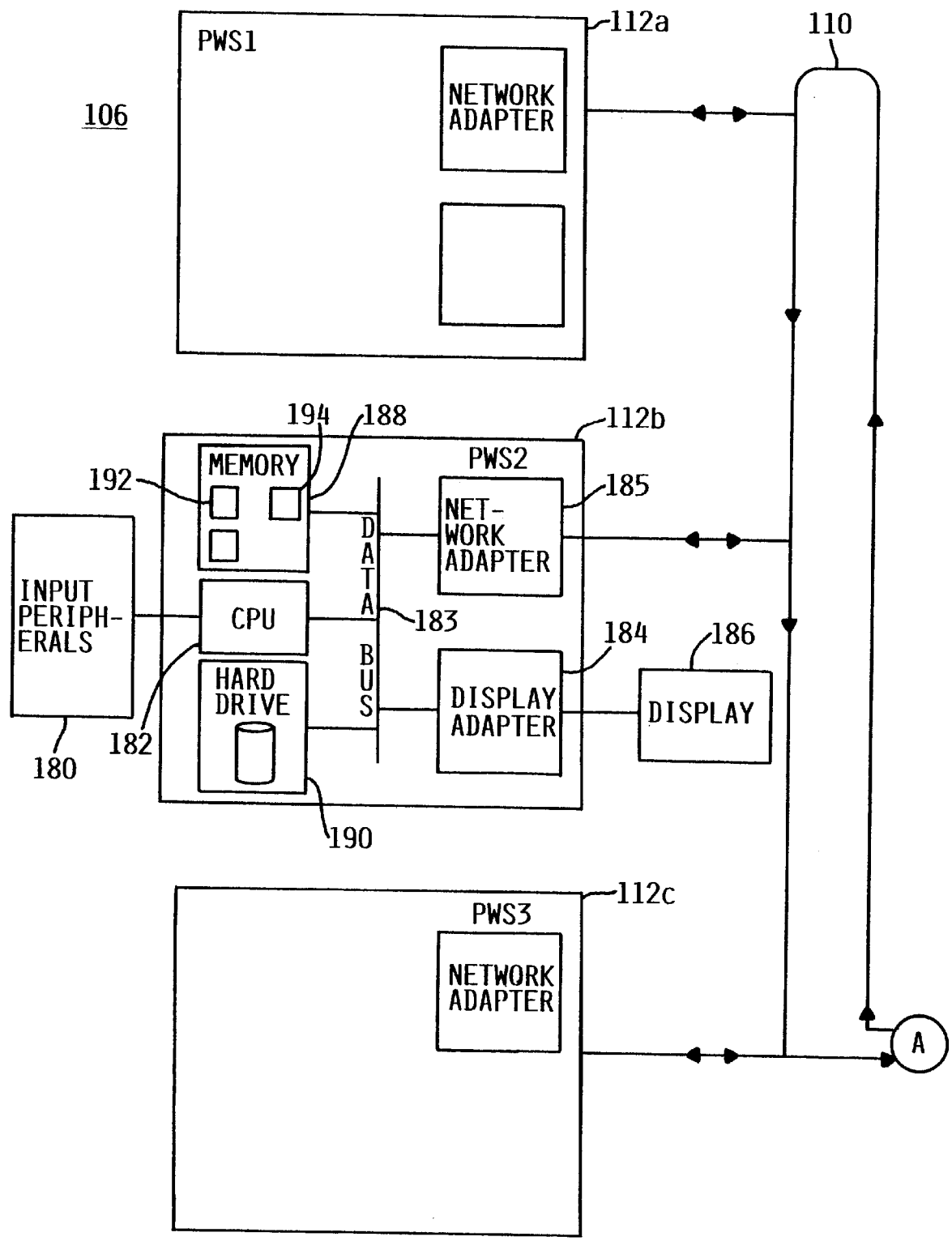
FIG. 2 illustrates a more detailed block diagram representation of the network of FIG. 1 illustrating distribution of data objects supporting the system and method of the preferred embodiment.
Figure 2B:
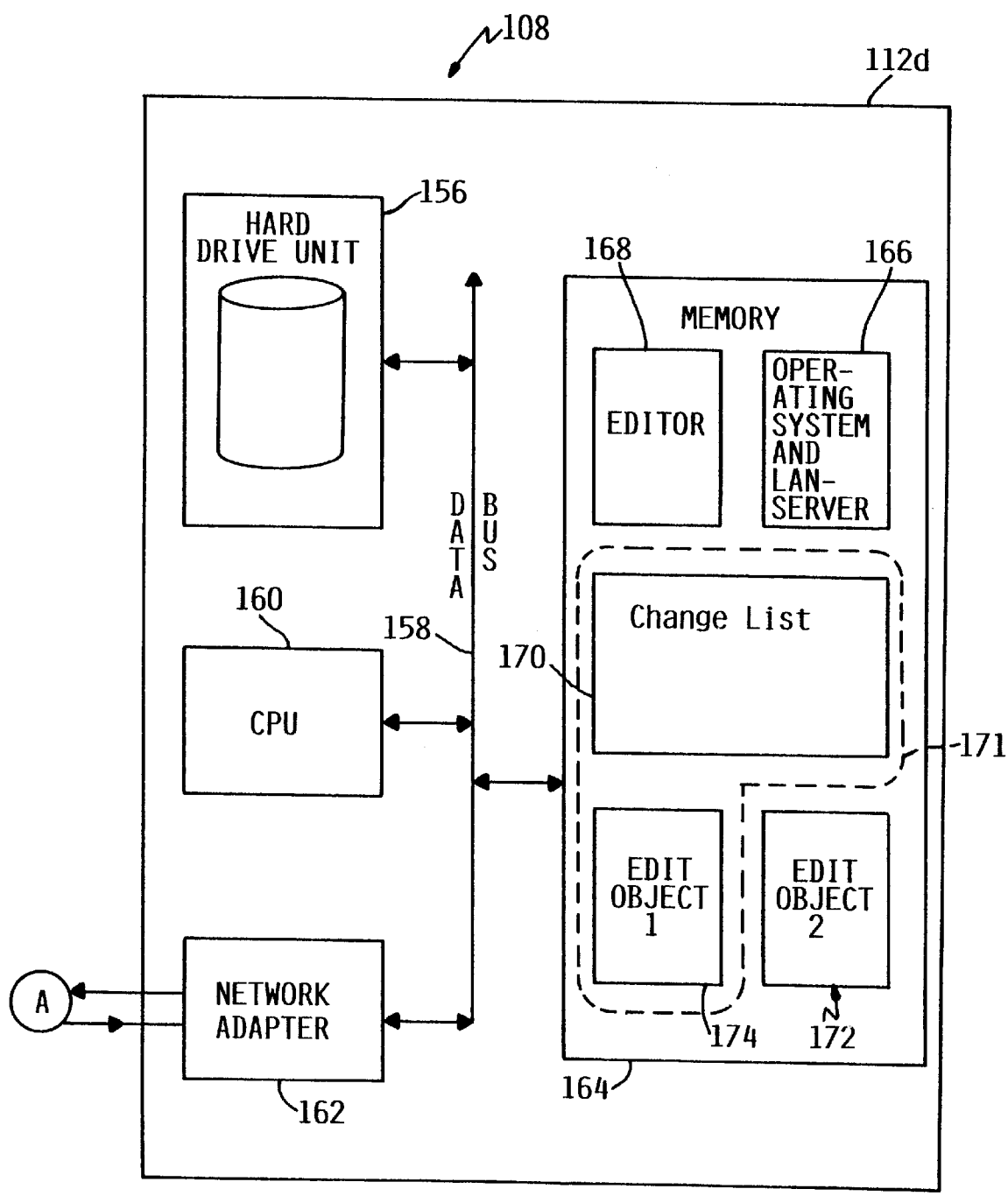

FIG. 2 depicts a block diagram of network 108, which is supporting a collaborative, computer-based, editing-system 106. Server 112d communicates with computers 112a–112c over communications channel 110. Although three client computers (112a, 112b, and 112c) are shown, any number of client computers could be present. Network 108 is depicted in a token-ring geometry, but other geometries are possible.

Server 112d is a conventional computer such as an IBM Personal System/2 or AS/400 system, programmed to practice the preferred embodiment, which includes central-processing-unit (CPU) 160, hard-drive unit 156, memory 164, and network adapter 162.

While any appropriate processor can be utilized for CPU 160, it is preferably one of the Power PC line of microprocessors available from IBM. Alternatively, CPU 160 can be implemented as one of the 80X86 or Pentium processors, which are available from a number of vendors.

Network adapter 162 connects to transmission channel 110. Network adapter 162 formats outgoing transmissions and deformats incoming transmissions across transmission channel 110.

Hard-drive unit 156 stores a plurality of shared-data objects pending a request for access by one or more users. Such a request results in the transfer of the data object to computer memory 164 over data bus 158. Although hard-drive unit 156 is shown as a single entity, it could in fact be multiple entities. Although hard-drive unit 156 is a Direct-Access-Storage-Device (DASD) in the preferred embodiment, it could also be a CD-ROM, a tape drive, a floppy-diskette drive, or any other type of secondary storage.

A number of objects exists within memory 164. An operating system and local-area-network server 166 are represented as one object. Editor program 168 and change list 170 are associated with a particular shared-data object, such as first-edit object 174, to provide a cooperative machine for generation and modification of the shared-data object. Additional edit objects may simultaneously exist such as second-edit object 172. Although the preferred embodiment is described within the context of an editor program, the invention is equally applicable to any other kind of environment in which changes are made to a shared-data object; for example, a data-base management facility operating against shared data, a drawing program operating against a shared drawing, an accounting program operating against shared data or spreadsheets, or a planning or project-management tool operating against shared data. Although memory 164 is shown as a single entity, it could in fact be a plurality of entities. The contents of memory 164 can be loaded to and stored from hard-drive unit 156 as needed.

Users access the shared-data objects in server 112d through computers 112a, 112b, and 112c. Computer 112b is a typical example and operates as a personal workstation communicating with server 112d. Schematically, in this example, personal workstation 112b is substantially similar to server 112d, and includes network adapter 185, display adapter 184, hard-drive unit 190, central-processing-unit (CPU) 182, and addressable memory 188. Components of personal workstation 112b transfer data over data bus 183. CPU 182 directly controls input peripherals 180, which may include a keyboard and a mouse or other pointing device. Display adapter 184 drives display device 186, upon which windows are generated. Memory 188 includes replica 192 of document 171 accessed by the user of personal workstation 112b. Replica 192 is accessed to change a user's personal view of the shared-data object without the necessity of burdening network 108 for transfer of the data to support the private view. Also present is command structure 194 for use in establishing a communications session on network 108.

The machine for affecting changes in first-edit object 174 is its associated editor 168 and change list 170. Document 171 constitutes change list 170 and target edit object 174. Change list 170 is more fully described under the description for FIG. 7. Although editor 168, change list 170, and edit object 174 are shown as existing on server 112d in the preferred embodiment, in an alternative embodiment they could exist on one or multiple of clients 112a, 112b, and/or 112c.

Figure 3:
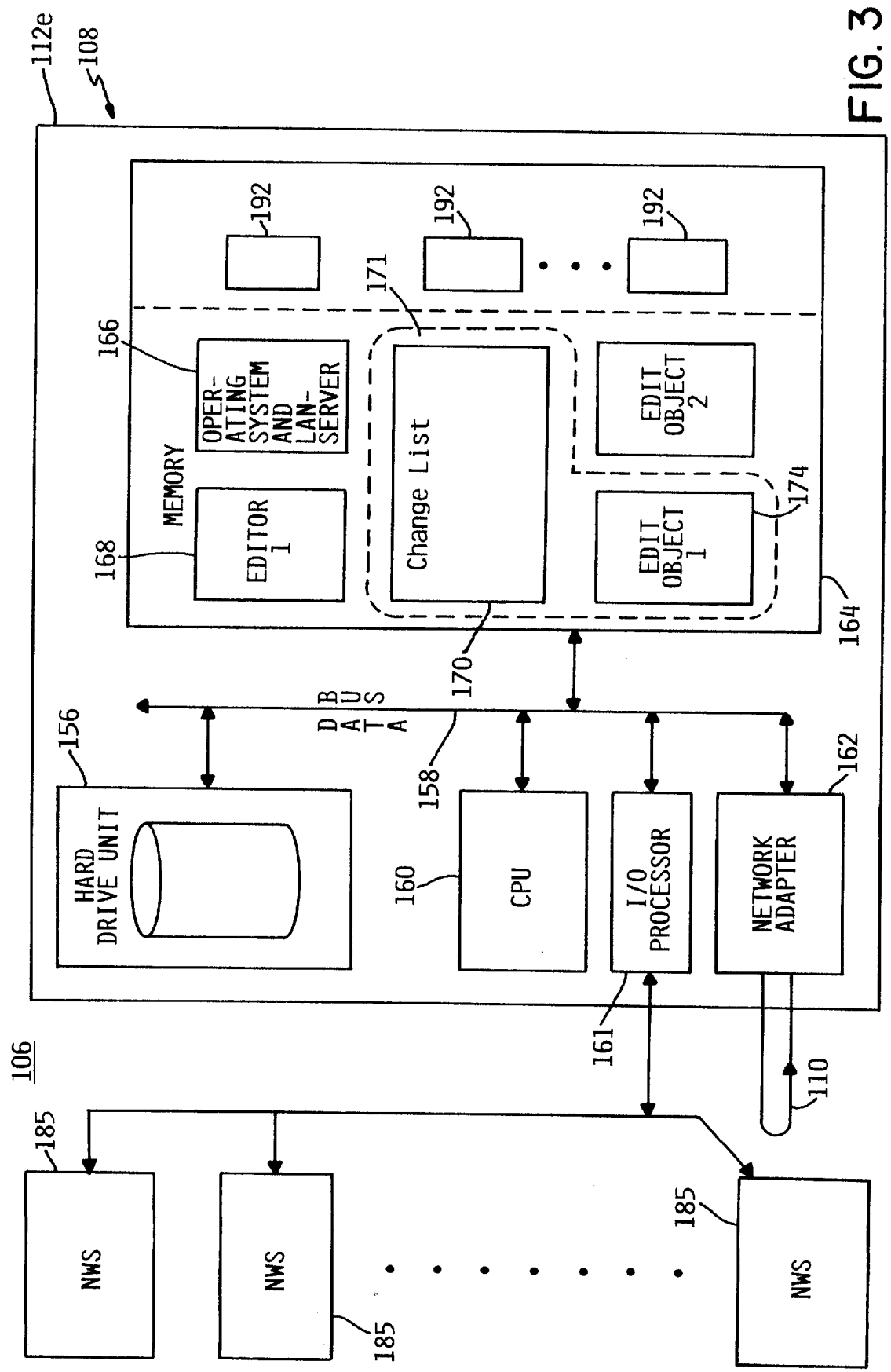
FIG. 3 depicts a block diagram of an alternative embodiment for supporting collaborative computer-based processing.

FIG. 3 depicts a block diagram of an alternative embodiment for supporting collaborative, computer-based system 106. FIG. 3 is similar to FIG. 2, except that replicas 192 of document 171 for clients 112a, 112b, and 112c are contained in memory 164 and executed within server 112e. Input/output processor 161 communicates with a plurality of non-programmable workstations (NWS) 185. In this alternative embodiment, server 112e becomes a single, host computer system running multiple processes such as an IBM Application System/400 attached to multiple non-programmable workstations. Memory 164 has a respective replica 192 corresponding to each non-programmable workstation 185.

As will be described in detail below, aspects of the present invention pertain to specific method steps implementable on computer systems. In an alternative embodiment, the invention may be implemented as a program product for use with a computer system. The programs defining the functions of the present invention can be delivered to a computer via a variety of signal-beating media which include, but are not limited to (a) information permanently stored on non-writable storage media (e.g., read only memory devices within a computer such as ROM or CD-ROM disks readable by a CD-ROM drive); (b) alterable information stored on writable storage media (e.g., floppy disks within a diskette drive or hard-drive unit 156); or (e) information conveyed to computer with the communications media, such as through a computer or telephone network, including wireless communications. Therefore, such signal-bearing media, when carrying computer readable instructions that direct the method functions of the present invention, represent alternative embodiments of the present invention.

Figure 8A:
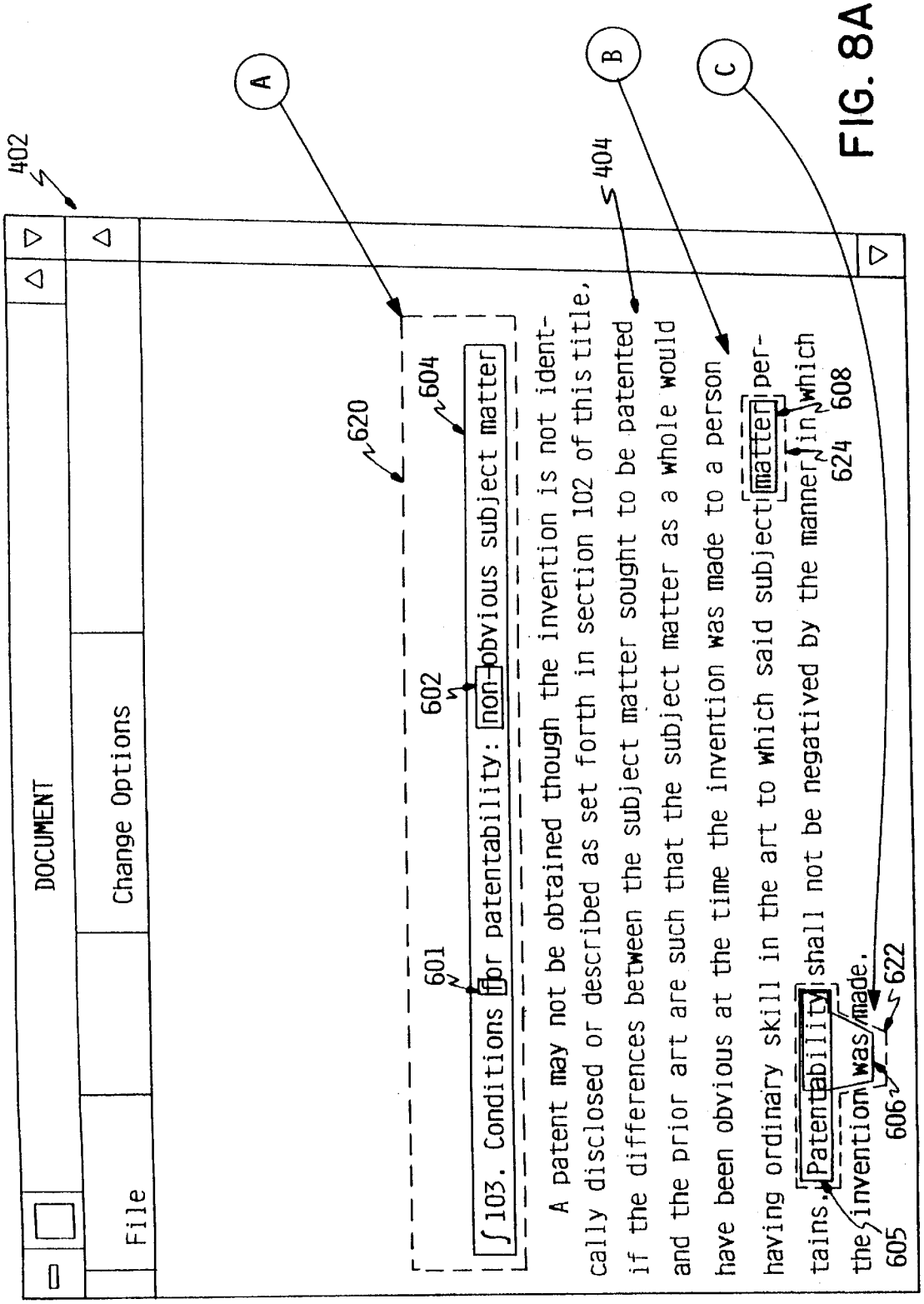
FIGS. 8, 9, and 10 depict an example of the relationships between the simultaneous view of a shared object that users see and the primary data structures of the preferred embodiment.
Figure 8B:
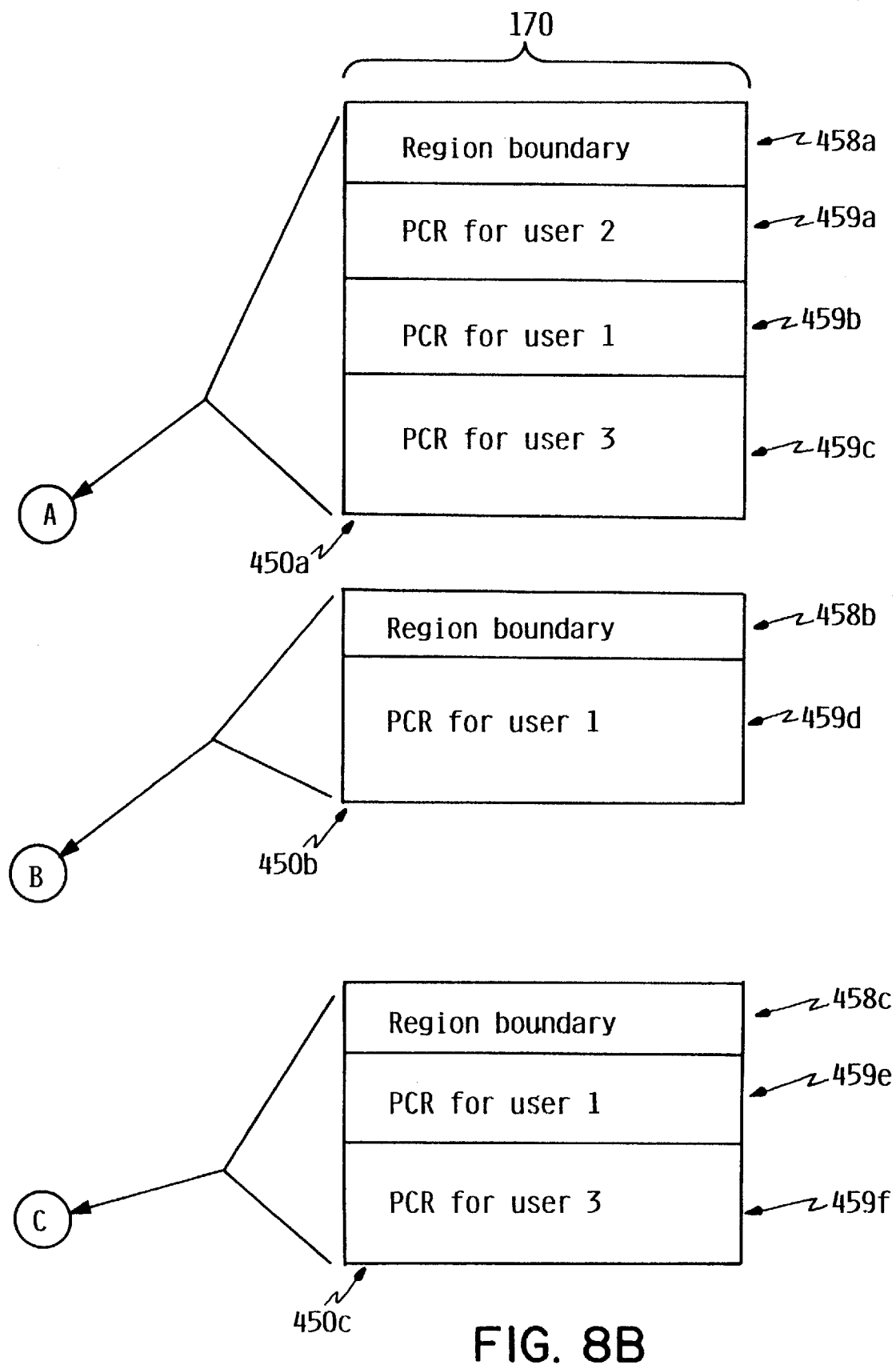
Figure 9A:
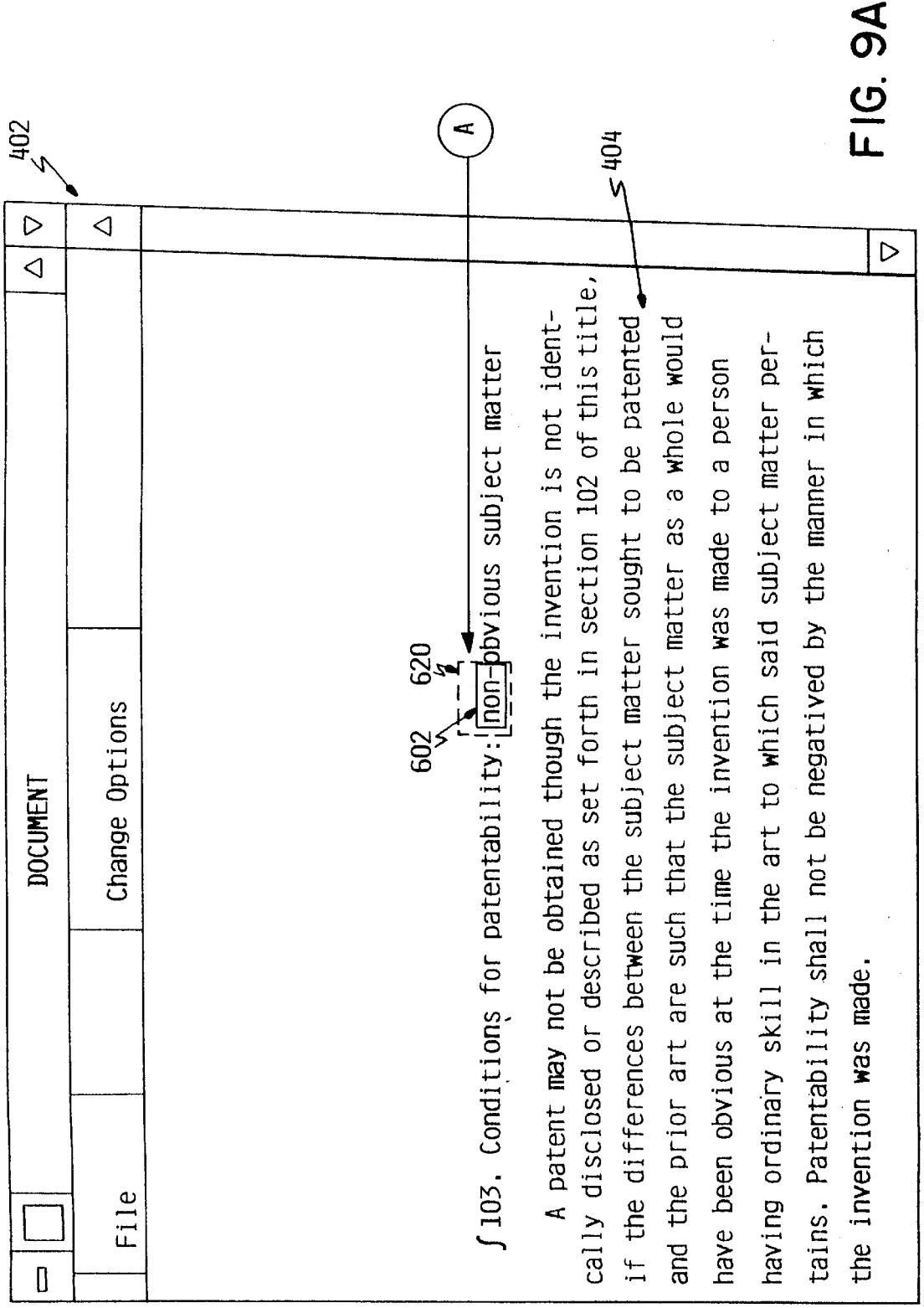
Figure 9B:
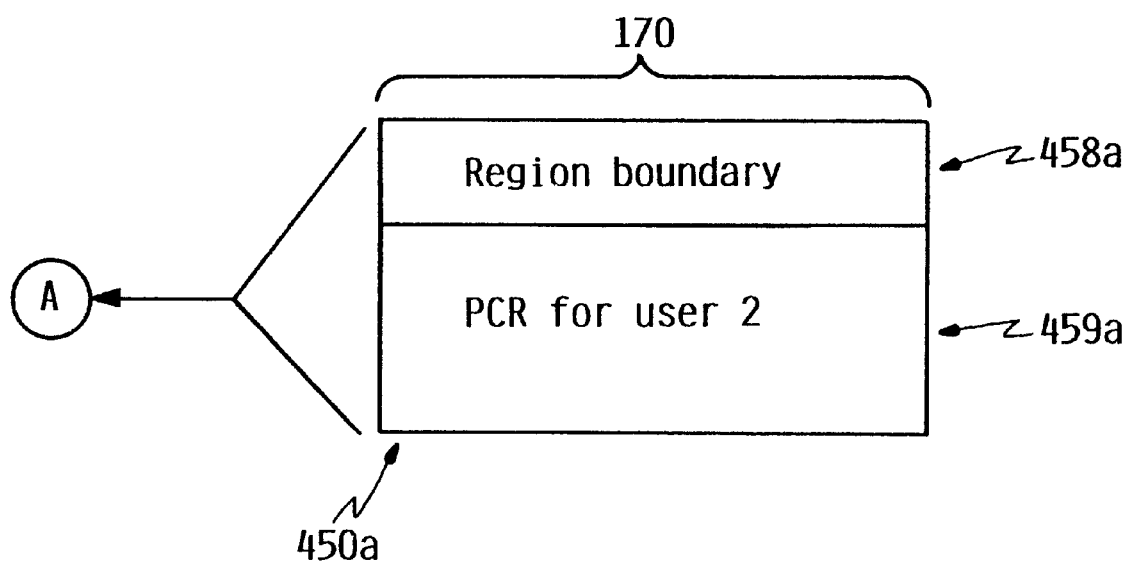
Figure 10A:
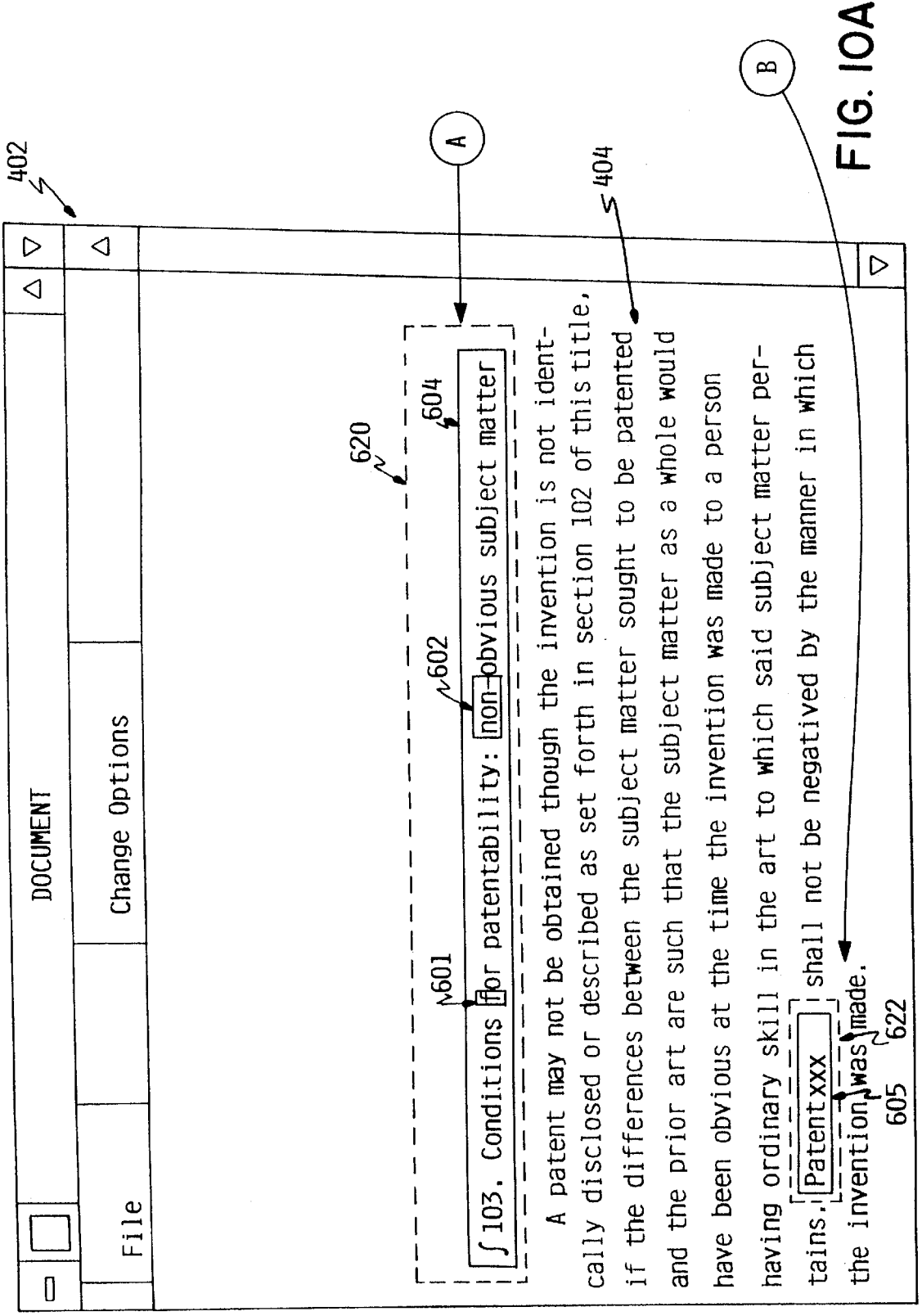
Figure 10B:
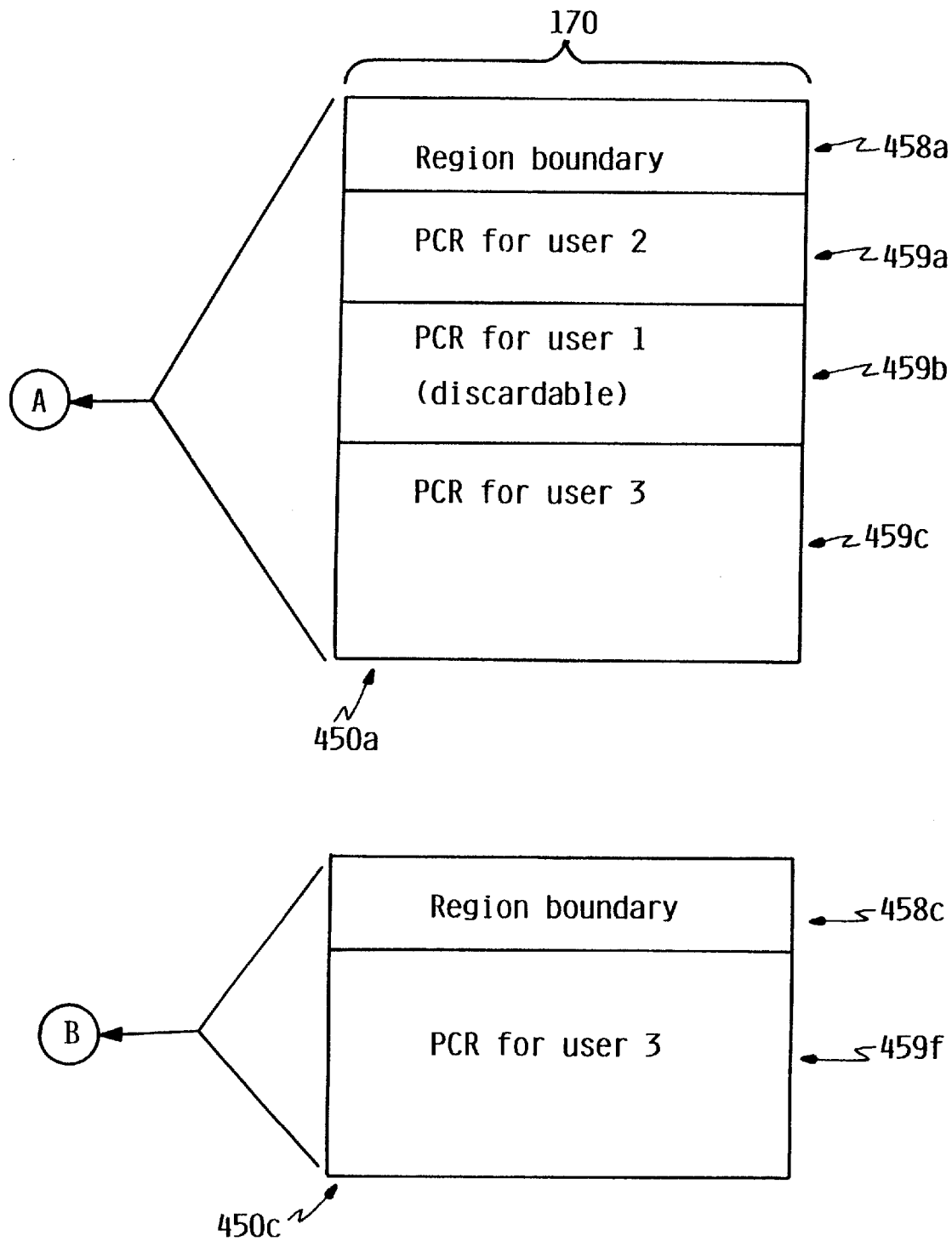

CPU 160 is suitably programmed to carry out this invention by editor 168, as described in more detail in the flowcharts of FIGS. 8–10. In the alternative, the function of FIGS. 8–10 could be implemented by control circuitry through the use of logic gates, programmable-logic devices, or other hardware components in lieu of a processor-based system.

Referring to FIG. 4, there is illustrated a pictorial representation of a user interface for the preferred embodiment. Simultaneous view 404 is displayed in window 402. Simultaneous view 404 includes the contents of edit object 174 and the pre-commit changes that users have entered for edit object 174, but that editor 168 has not yet saved to edit object 174. In simultaneous view 404, editor 168 merges those pre-commit changes and the contents of edit object 174. so that all users have a view of the shared object as if the pre-commit changes had been applied to shared edit object 174. Pre-commit changes are further described under the description for FIGS. 6–10. Editor 168 gives the user change-options 406 in a pull-down menu as "immediate" 408, "allow changes" 410, and "don't allow changes" 412.

Figure 5:
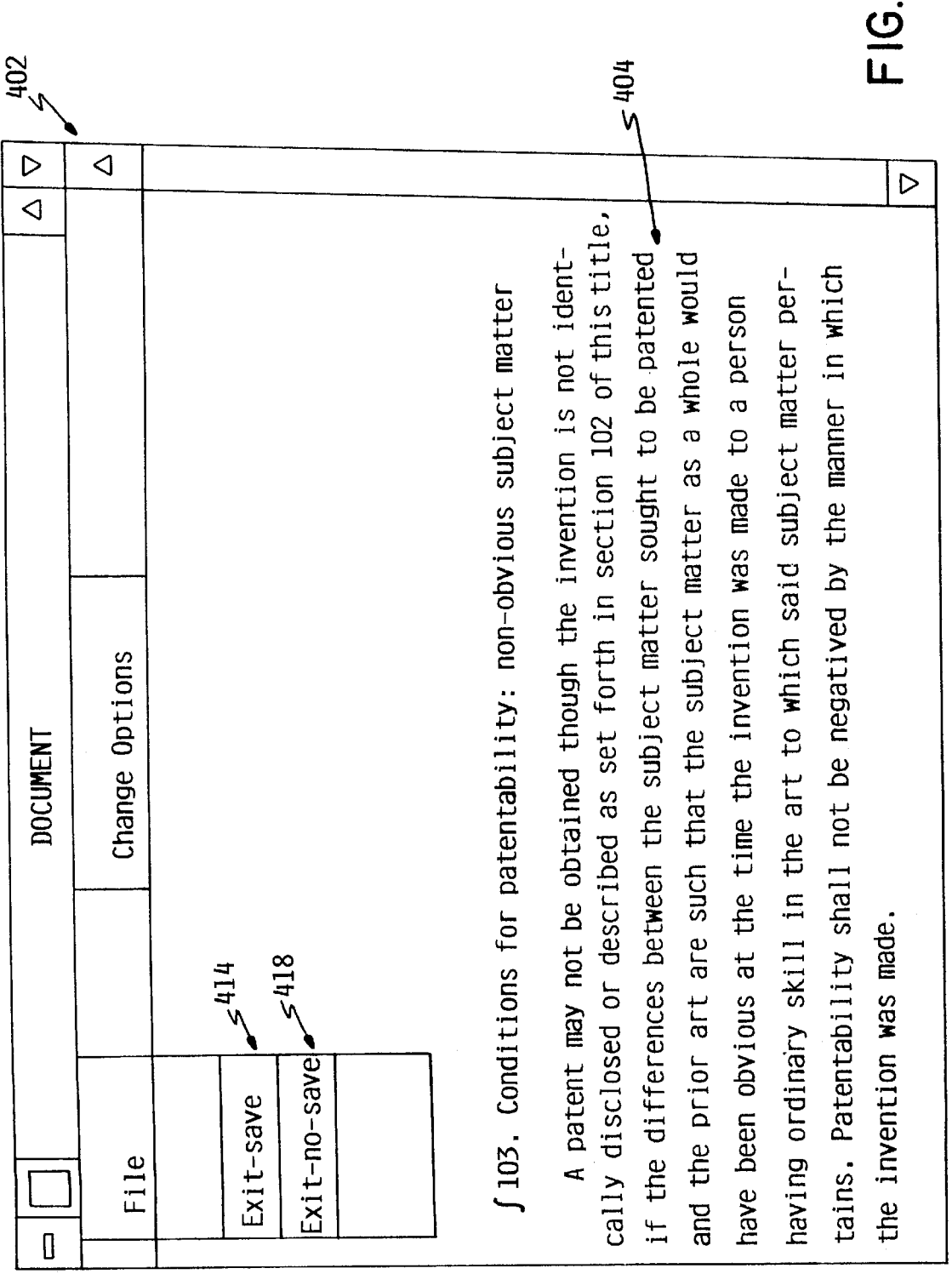
FIG. 5 depicts a pictorial representation of user interface options supported by the preferred embodiment.

Additional user interface options are shown in FIG. 5. Again, simultaneous view 404 of edit object 174 and pre-commit changes are displayed in window 402. When the user wishes to exit the editing of edit object 174, the user selects either exit-save option 414 or exit-no-save option 418, which are provided by editor 168. If the user selects exit-no-save option 418, editor 168 will not save this user's previously entered changes. If the user selects exit-save option 414, editor 168 will apply the user's pre-commit changes to edit object 174. Although the preferred embodiment is described in the context of saving upon exiting, it is equally applicable to the operation of saving changes without exiting the editor. The exit-no-save option applies equally well to an "undo" or an "erase" function.

Figure 6:
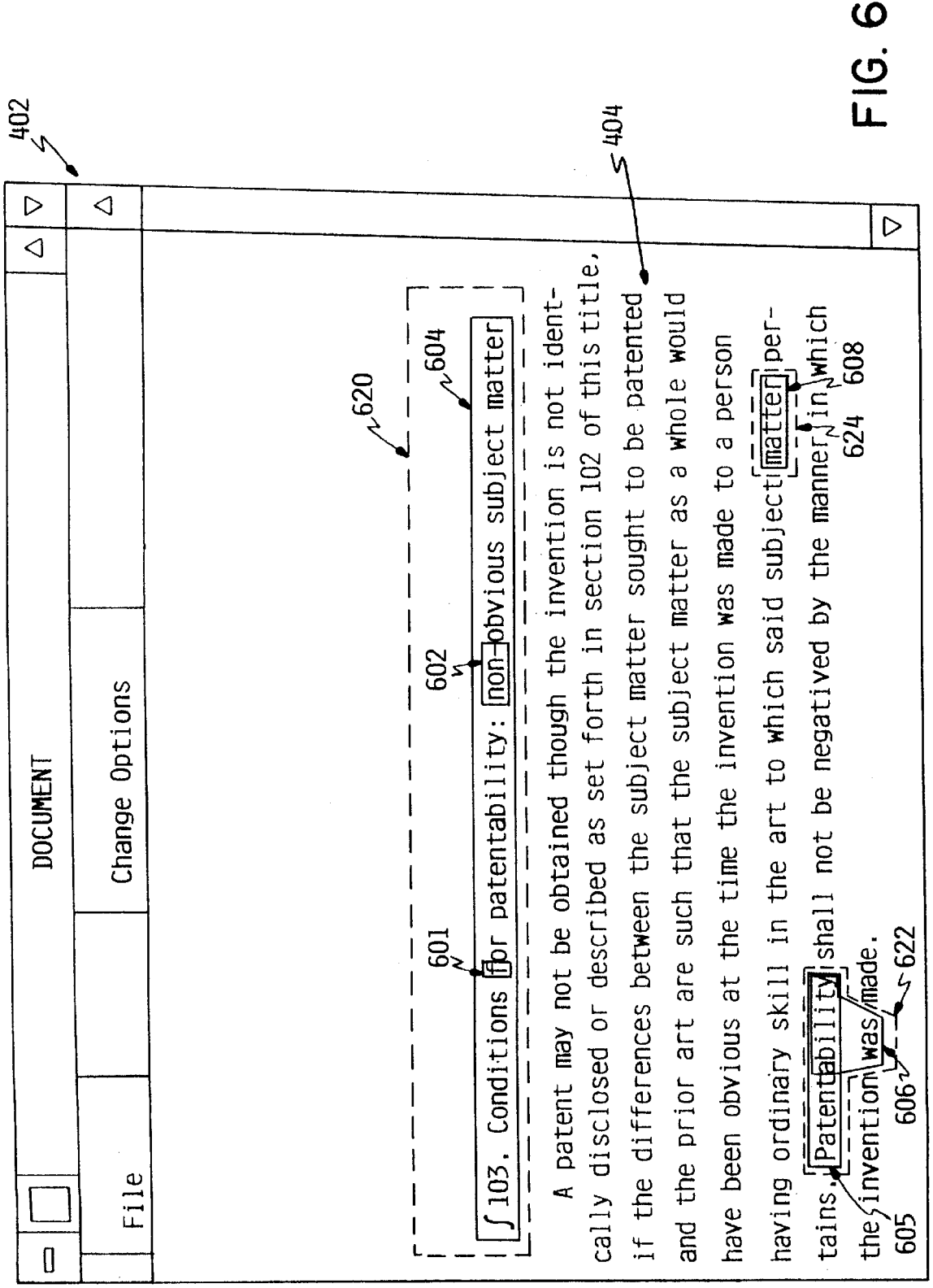
FIG. 6 depicts a pictorial representation of a variety of pre-commit regions.

Referring to FIG. 6, a pictorial representation of pre-commit regions is shown. Simultaneous view 404 is shown displayed by editor 168 in window 402, as previously described under the description for FIG. 4. Editor 168 determines the pre-commit region sizes based on the size of the changes that the user makes. In the preferred embodiment, editor 168 chooses the pre-commit region sizes to be as small as possible. For example, pre-commit region 604 is one line because the user inserted an entire line as one change operation. But, in an alternative embodiment, editor 168 could choose the pre-commit region sizes to be larger than the change the user makes; for example, the editor might use a line as the smallest pre-commit region size.

A variety of resolutions for pre-commit regions are shown. For example, pre-commit regions 601 and 602 are partial words in size. Pre-commit region 605 and 608 are one word in size. Pre-commit region 606 spans multiple words and includes a partial word. Pre-commit region 604 is one line in resolution. A pre-commit region could also be an entire paragraph or more in resolution.

In an alternative embodiment such as a graphics editor, the pre-commit region could also be a physical measurement, such as a rectangular area, and not tied to textual characters.

Editor 168 optionally highlights the pre-commit region boundaries, so that they are simultaneously visible to all the users. PCR's that were created by another user with the don't allow changes option 412 are specially marked so that other users realize that they are not allowed to make changes to the areas of the document associated with those PCR's until the owner commits the changes.

Pre-commit regions 601, 602, and 604 are contained in change region 620. Pre-commit regions 605 and 606 are contained in change region 622. Pre-commit region 608 is contained in change region 624.

Figure 7A:
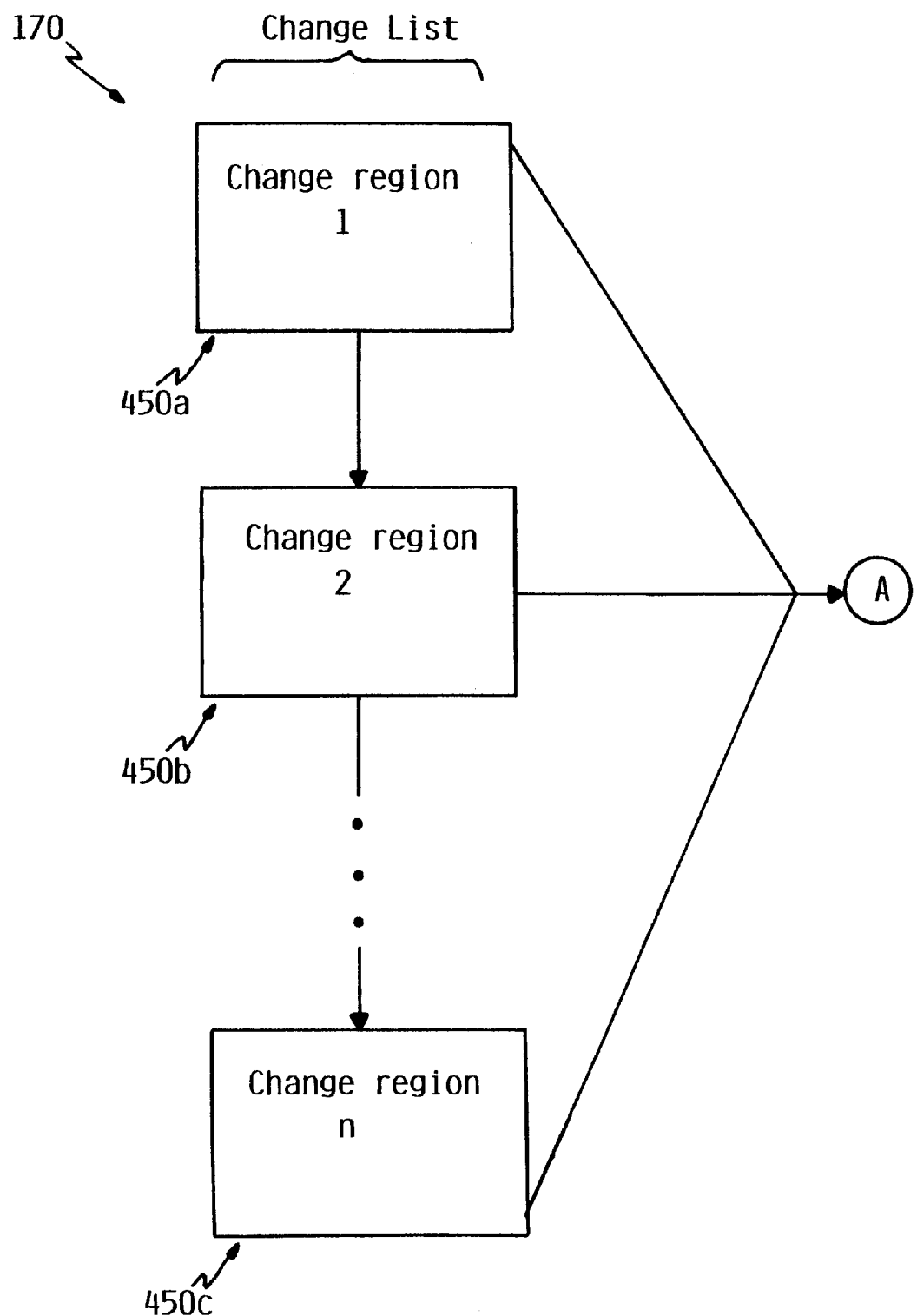
FIG. 7 depicts a block diagram of the primary data structure of the preferred embodiment.
Figure 7B:
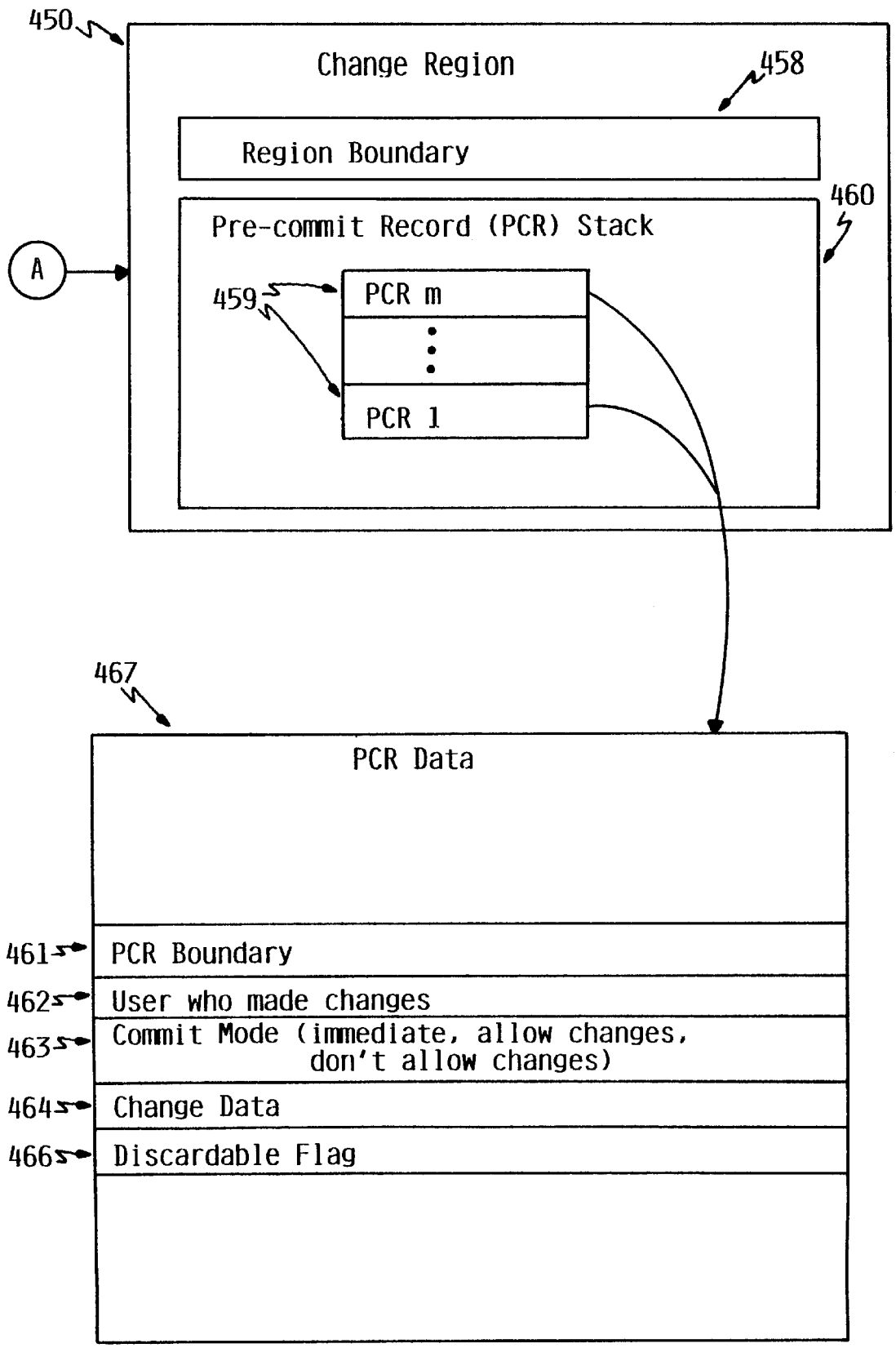

Referring to FIG. 7, a block diagram of change list 170 is shown. Change list 170 is the primary data structure of the preferred embodiment. Change list 170 is a list of change regions that contain uncommitted changes that the users have entered using editor 168 for edit object 174. Change list 170 contains a linked list of n change regions: change region-1 450a, change region-2 450b, through change region-n 450c. Each change region 450 contains change-region boundary data 458 and pre-commit records stack 460, containing 1 through m pre-commit records (PCR) 459. Change-region boundary 458 defines the boundary of the amalgamation of all of its pre-commit records 460. The change data 464 in pre-commit records 460 within a single change region 450 are in some way dependent on each other or overlap; that is, the changes represented by the pre-commit records 460 within a single change region 450 are not completely disjoint, as further described under the description for FIG. 8a.

In the example of FIG. 6, there would be three change regions 450 in change list 170. A first change region 450a would correspond to change region 620, and its region boundary data 458 would contain data describing the dashed line for change region 620 on FIG. 6. The second change region 450b would correspond to change region 622, and its region boundary data 458 would describe the dashed line for change region 622 shown on FIG. 6. The third change region 450c would correspond to change region 624, and its region boundary data 458 would correspond to the dashed line shown for change region 624 in FIG. 6.

Referring again to FIG. 7. each of pre-commit records 459 in PCR stack 460 contains PCR data 467, which contains PCR boundary 461, an identification of the user who made the changes 462, commit mode 463, change data 464, and discardable flag 466. The contents of commit mode 463 can be "immediate", "allow changes", and "don't allow changes", which are set by editor 168 from corresponding change options 406 as shown in FIG. 4. In the example of FIG. 6, there will be a PCR entry 459 for each of the pre-commit change regions 601, 602, 604, 605, 606, and 608. PCR boundary data 461 defines the boundaries for the respective pre-commit change regions, as shown as the solid lines on FIG. 6. Change data 464 defines the pre-commit change data that user 462 has entered via editor 168, but not yet committed to edit object 174. For example, if the user has originally typed in region 601 the word "or" and then later changed it to "for", then there would be a PCR stack entry 459 with a change boundary field 461 pointing to pre-commit region 601 with its change data 464 being the addition of the letter "f" in front of "or". Even though edit object 174 has not yet had the changes in change data 464 committed (or saved) to it, editor 168 applies change data 464 to the simultaneous display that all the users view, e.g. on display 186, as if the changes had actually already been made to edit object 174. Discardable flag 466 is further described under the description for FIG. 9.

FIGS. 8, 9, and 10 show the relationship of simultaneous view 404 to change list 170 for an example where three users are making changes to edit object 174. Referring to FIG. 8, editor 168 has displayed simultaneous view 404 in window 402. Change regions 450a, 450b, and 450c are change regions in change list 170. Change region 450a contains region boundary 458a, PCR for user two 459a, PCR for user one 459b, and PCR for user three 459c. Change region 450b contains region boundary 458b and PCR for user one 459d. Change region 450c contains region boundary 458c, PCR for user one 459e, and PCR for user three 459f Region boundary data 458a describes the region bounded by the dashed line associated with reference numeral 620. Region boundary data 458b describes the region bounded by the dashed line associated with reference numeral 624. Region boundary data 458c described the region bounded by the dashed line associated with reference numeral 622.

In the example of FIG. 8, user three made the change associated with reference numeral 604, which caused editor 168 to create PCR 459c describing this change. User three also made the change associated with reference numeral 605, which caused editor 168 to create PCR 459f describing this change. Before making these changes, user three selected allow-changes option 410, so editor 168 allowed users one and two to make changes that are dependent on the changes made by user three. User one then created the change associated with reference numeral 601, which caused editor 168 to create PCR 459b describing this change. User one then created the change associated with reference number 608 which caused editor 168 to create the PCR 459d describing this change. User one then entered the change associated with reference numeral 606, which caused editor 168 to create PCR 459e describing this change. User one created these changes after specifying change-options allow-changes 410, which allowed user two to create an additional change that is dependent upon the changes created by user one. User two then created the change associated with reference numeral 602, which caused editor 168 to create PCR 459a describing this change. User two created this change using change-option don't-allow-changes 412, so no further changes are allowed that are dependent on the change created by user two.

FIG. 9 shows the relationship of simultaneous view 404 and change list 170 subsequent to FIG. 9 after user one has performed a save operation such as exit-save 414. This save option request by user one causes editor 168 to commit all of user one's changes to edit object 174 as well as all of the changes in all of the change regions below user one in the PCR stacks. Thus, in FIG. 9, the only PCR left remaining after the save operation by user one is PCR 459a, which is contained in change region 450a. Its corresponding change is shown as the solid line bounded by reference numeral 602 which is contained in change region 620. Notice that the text in simultaneous view 404 in FIG. 9 is exactly the same as the text in simultaneous view 404 of FIG. 8. This identity of textual display occurs because editor 168 merges the pre-commit changes and the contents of edit object 174 in order to create simultaneous view 404.

FIG. 10 shows the relationship of simultaneous view 404 and change list 170 subsequent to FIG. 8 after user one has performed a cancel operation, such as exit-no-save 418. (FIG. 10 is an alternative scenario to FIG. 9.) For a cancel operation, editor 168 discards all PCRs on which no other changes are dependent. Thus, PCR 459d and PCR 459e from FIG. 8 are not present in FIG. 10. PCR 459b is marked as being discardable via discardable flag 466 but is not actually discarded at this time because user two has made a subsequent change that depends on user one's change. This is shown in FIG. 10 as PCR 459a being on top of PCR 459b in the PCR stack. In the future, if user two discards its changes then the change associated with PCR 459b will be discarded at that time since its discardable flag is set.

Figure 11A:
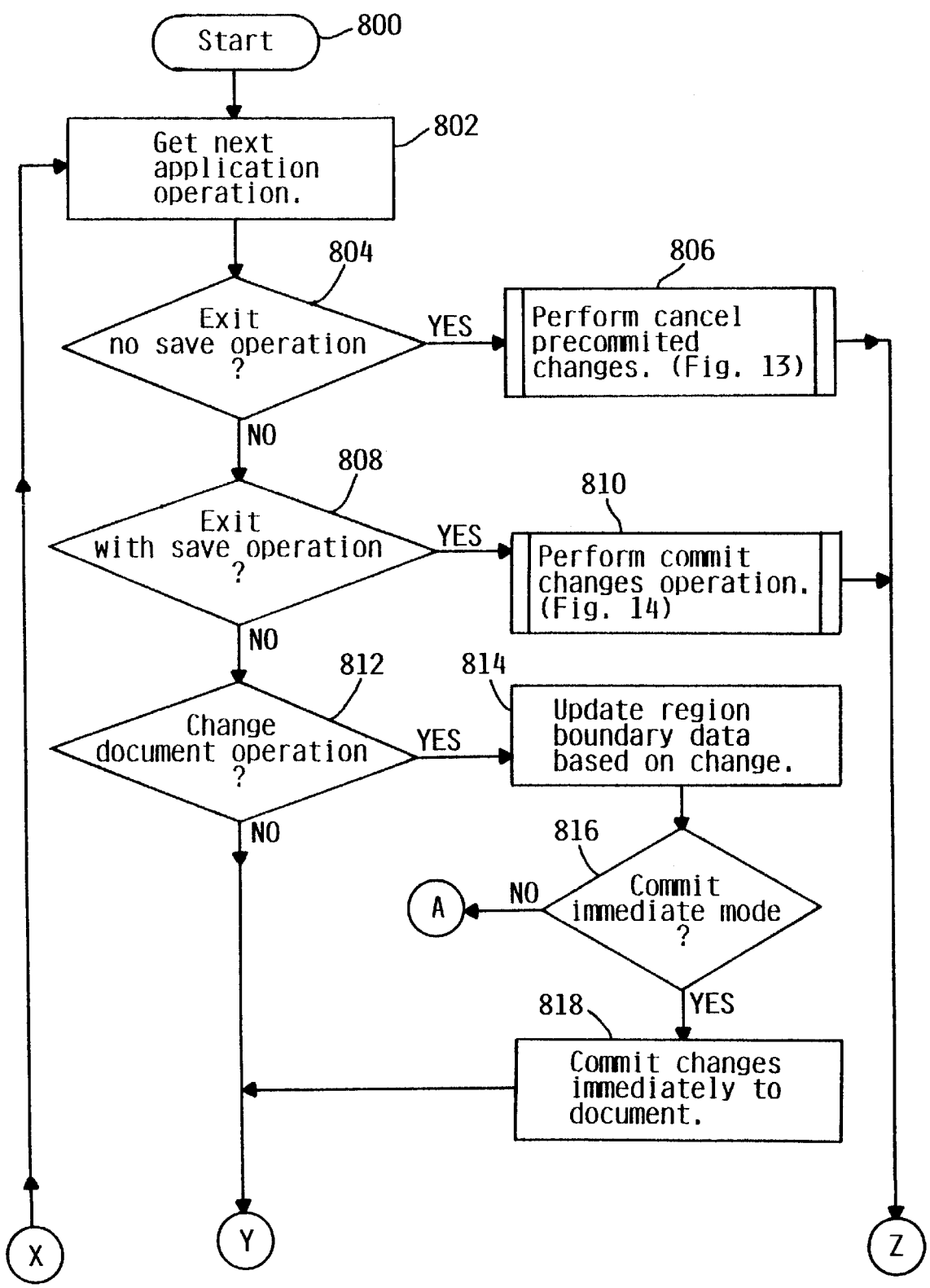
FIGS. 11, 12, 13, and 14 illustrate flowcharts that describe the operation of the preferred embodiment.
Figure 11B:
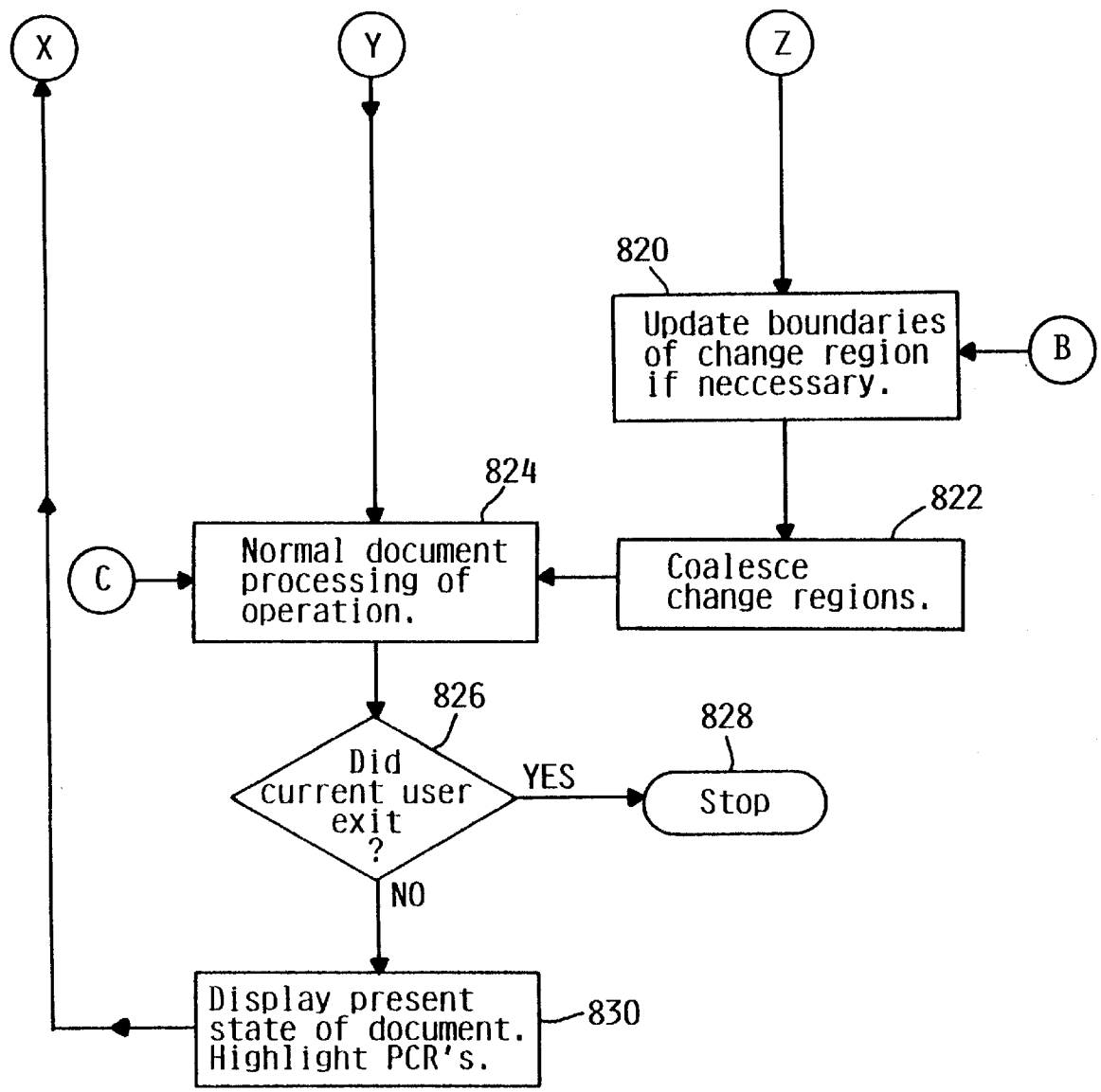
Figure 13:
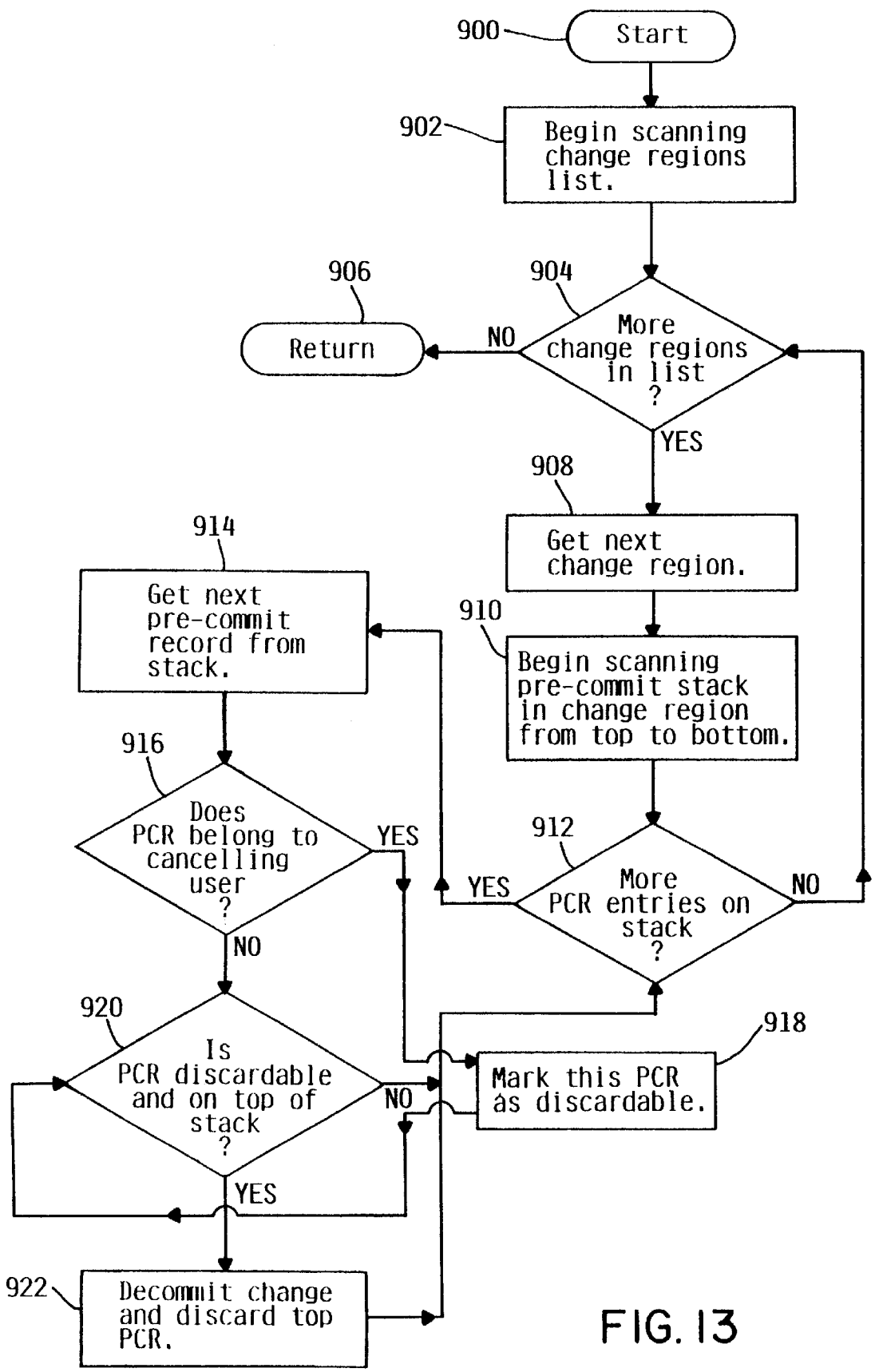

Referring to FIG. 11, at block 800 processing for editor 168 starts. At block 802, editor 168 gets the next editor operation. An editor operation can be any keystroke or pointing-device operation that the user enters while editing edit object 174. Flow then continues to block 804, where editor 168 determines whether the editor operation is an exit-no-save operation. The user can request a exit-no-save operation by selecting exit-no-save option 418, as previously described under the description for FIG. 5. Referring again to FIG. 11, if the user has requested an exit-no-save operation, then flow continues to block 806, where editor 168 performs the cancel-precommitted-changes operations as further described under the description for FIG. 13. Referring to FIG. 13, at block 900 processing starts. At block 902, editor 168 begins scanning change list 170. At block 904, editor 168 determines whether there are more change regions 450 left to be scanned in change list 170. If there are no more regions left to be scanned, then flow continues to block 906 where editor 168 returns.

If there are more regions left to be scanned in change list 170, then flow continues to block 908, where editor 168 gets the next change region in change list 170. Flow then continues to block 910, where editor 168 begins scanning pre-commit stack 460 in the current change region. Editor 168 scans stack 460 from top to bottom. Flow then continues to block 912 where editor 168 determines whether there are more PCR entries 459 in stack 460. If there are not more PCR entries 459 on stack 460, then flow continues back to block 904 as previously described. If there are more PCR entries on stack 460, then editor 168 continues to block 914, where it gets the next PCR 459 from stack 460 for the current change region.

At block 916, editor 168 determines whether the PCR belongs to the cancelling user by comparing user field 462 in PCR 459 to the user who requested the exit-no-save operation. If this PCR does belong to the cancelling user, then at block 918 editor 168 marks this PCR as discardable via discardable flag 466 and continues to block 920. If this PCR does not belong to the cancelling user, then editor 168 continues directly to block 920 where it determines whether the PCR is discardable via discardable flag 466 and is on the top of stack 460 in the current change region.

If a PCR is on the top of stack 460, this means that there are no other changes that depend on the change in the top PCR, and therefore the top PCR can be discarded. If a first user is doing an exit-no-save operation and a second user has made a change on top of the first user's change, then the first user's PCR will not be on the top of stack 460 and therefore cannot be immediately discarded. Instead the first user's change is marked as being discardable in the future via discardable flag 466. If the second user commits the second user's changes then the first user's changes will be committed as well. But, if the second user cancels, then when the second user executes the logic of FIG. 13, the second user will discard both the second user's changes and the first user's changes. This occurs because after the second user removes the second user's PCR from stack 460 then the first user's PCR will be the top entry on the stack 460 and therefore will be removed on the next pass through the logic of FIG. 13. (If the first user does not want the second user to make changes on top of the first user's changes and forced these changes to commit, even if the first user cancels, then the first user may choose the "don't allow changes" commit mode.)

If the determination at block 920 is false then control continues back to block 912. If this determination is true, then editor 168 decommits the change by discarding the top PCR 459 from PCR stack 460. As a result, editor 168 will not display the changes associated with the discarded PCR when other users execute the logic of block 830 of FIG. 11, as described below.

Referring back to FIG. 11, flow then continues to block 820, where editor 168 updates PCR boundary 461 for any PCR's that were affected since the processing for the editor operation in FIG. 13 may have removed PCR's, and removing the changes in the PCR may modify the line and column numbers for contents 404 of edit object 174, and some applications use line and column numbers for relative position information in change data 464, which will affect PCR boundary 461. At block 822, editor 168 updates change region boundaries 458 for each change region 450 in change list 170 to bound the PCR's that each contains and editor 168 coalesces change regions 450 to combine them if they overlap. Also, editor 168 can split a change region 450 if its PCR's are completely disjoined and do not overlap. To illustrate the combination and splitting of change regions consider the following example. User A changes the first word in a paragraph, and user B changes the fifth word in the same paragraph. There are now potentially two disjoint changes regions. User C underlines the entire paragraph, which causes editor 168 to combine the PCR's for user A, user B, and user C, into a single change region with the PCR for user C on top of the stack. User C then cancels the underline of the entire paragraph, so editor 168 discards the PCR for user C and splits the change back into two disjoint change regions.

At block 824, editor 168 performs normal document processing.

Flow now continues to block 826 where editor 168 determines whether the user selected either exit-save or exit-no-save. Since in this case the user selected an exit-no-save operation, which is an exit operation, processing stops at block 828.

If the user did not select an exit-no-save operation at block 804, flow continues to block 808, where editor 168 determines whether the user has selected an exit-with-save operation. The user may select an exit-with-save operation by selecting exit-save 414, as previously described under FIG. 5. If the user has selected exit-with-save, then editor 168 commits the changes in block 810 as further described below under FIG. 14.

Figure 14:
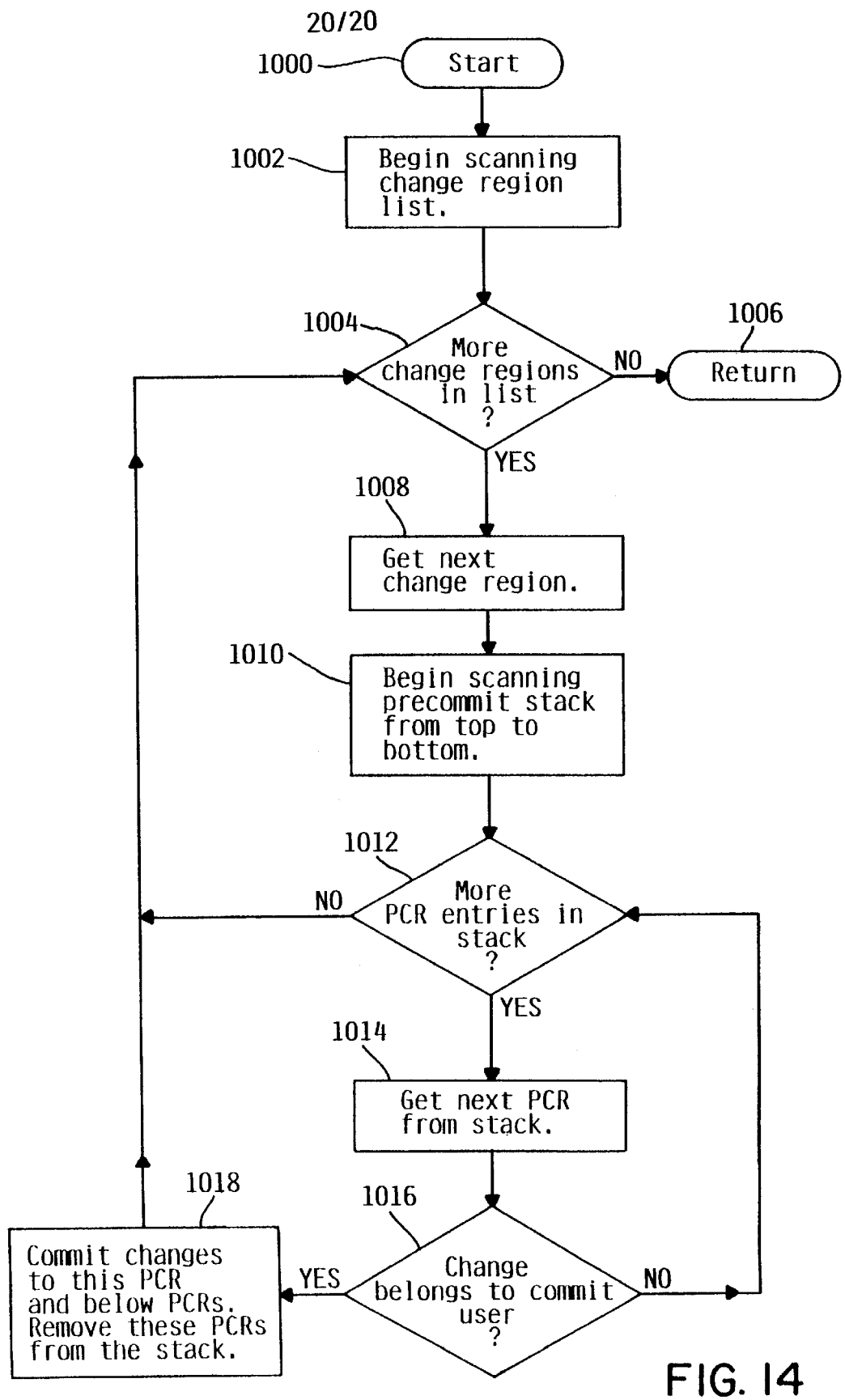

Referring to FIG. 14, control starts at block 1000. At block 1002, editor 168 begins scanning change list 170. At block 1004, editor 168 determines whether there are more change regions 450 left to be scanned in change list 170.

If there are change regions 450 left to be scanned, then at block 1008, editor 168 gets the next change region 450 in change list 170. Flow then continues to block 1010 where editor 168 begins scanning PCR stack 460 from top to bottom. Flow then continues to block 1012, where editor 168 determines whether there are more PCR entries 459 in the stack for this change region. If there are no more PCR entries 459, then flow returns to block 1004. If there are more PCR entries 459, then flow continues to block 1014 where editor 168 gets the next PCR entry from stack 460. Flow then continues to block 1016, where editor 168 determines whether the change associated with this PCR belongs to the user who is doing the exit-with-save operation by checking field 462. Editor 168 makes this determination by checking user field 462 in the current PCR entry 459. If this determination is false, then editor 168 returns to block 1012.

If this determination is true, then editor 168 continues to block 1018 where it commits the changes in change data 464 in this PCR and all PCR's below it in the stack to edit object 174. Committing the changes means that change data 464 in the committed PCR's are permanently applied to edit object 174 and the edit object is saved to secondary storage, such as hard-drive unit 156 in the preferred embodiment. Editor 168 then removes all these committed PCR's from stack 460 for this change region. Flow then continues to block 1004. If there are no more change regions 450 left, then editor 168 returns to FIG. 11 at block 4006. Referring again to FIG. 11, flow then continues to block 820, as previously described above.

If the user did not select an exit-with-save operation at block 808, then editor 168 continues to block 812, where editor 168 determines whether the user has done a change document operation. Examples of change document operations are inserting, deleting, or replacing text. If the user has done a change document operation, then flow continues to block 814 where editor 168 updates region boundary data 458 (previously described in FIG. 7) to reflect any boundary data changes that the change document operation causes. For example, in a text document boundaries may be defined by line number and column number; if the change operation were to insert three lines into the document, at block 814 editor 168 would need to update the line and column numbers in region boundary 458 correspondingly. In contrast, in a graphics editor boundaries might be defined in absolute units, such as inches, and then perhaps no update to the boundary data would be required when the user does a change document operation.

Flow then continues to block 816 where editor 168 checks whether the user previously selected commit immediate 408 (FIG. 4). If the user did previously select commit-immediate 408, then flow continues to block 818 where editor 168 commits the changes immediately to edit object 174 without creating a PCR entry 459.

Flow then continues to block 824 where normal document processing is done. Flow then continues to block 826 where editor 168 determines whether the current user has selected an exit operation. Since in this case the user did not select an exit operation, flow continues to block 830 where editor 168 displays the present state of the document with all change data 464 applied for every PCR 459 in every PCR stack 460 in every change region 450 in change list 170. In this way, all users see the changes made by each other even though change data 464 has not yet been committed or saved to edit object 186. Editor 168 also visually highlights PCR boundary 461 for each PCR entry 459 in order to show their commit mode 463 in order to inform the user as to which parts of edit object 174 have uncommitted changes. In this way, the user can also distinguish between those areas where changes are not allowed and where changes are allowed, so that the user can adjust edits accordingly. Flow now returns to block 802.

Figure 12:
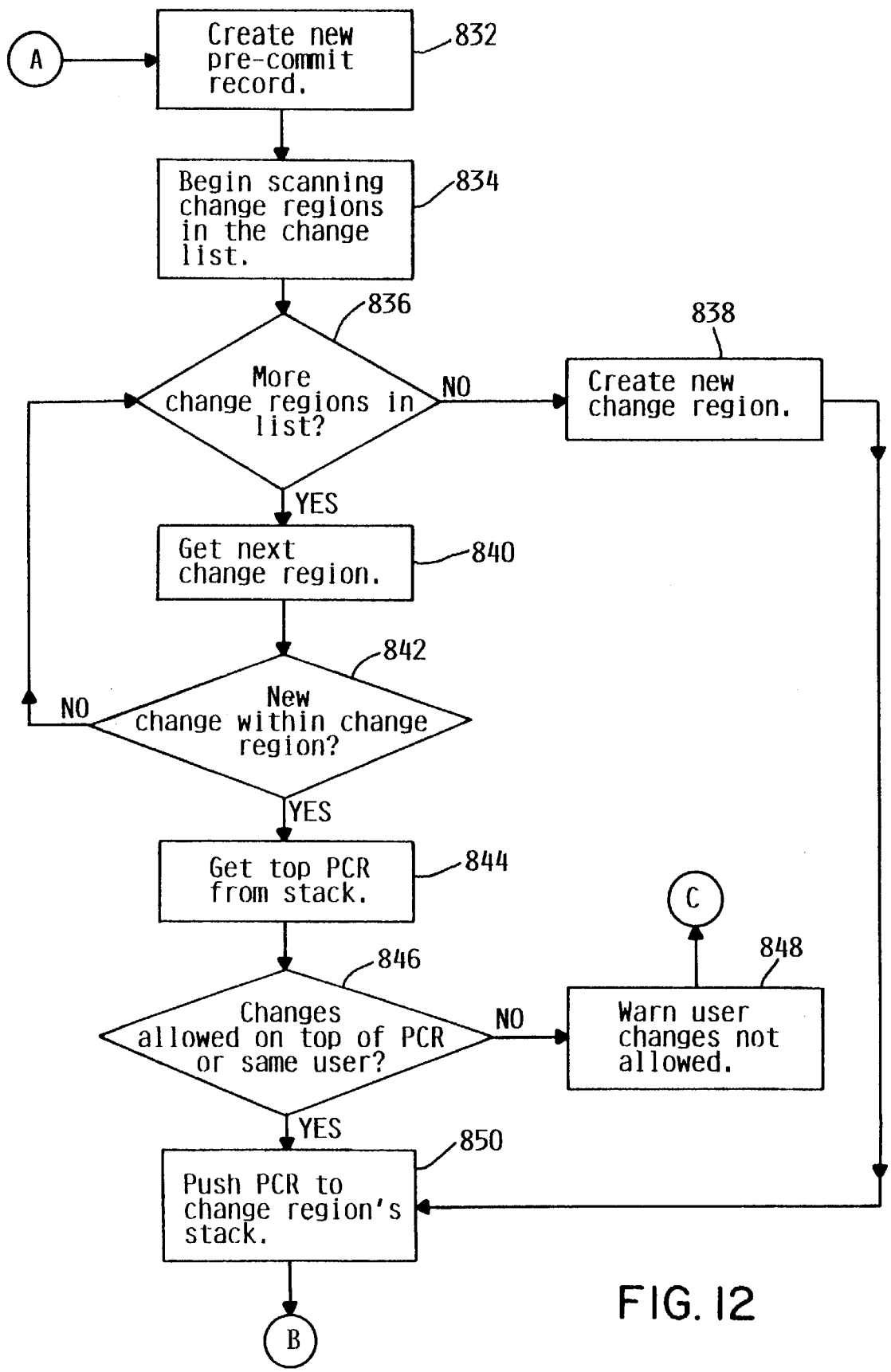

If the user did not previously select commit-immediate mode at block 816 then flow continues to block 832 (FIG. 12), where editor 168 creates a new pre-commit record 460 for the document change operation detected in block 812. Flow then continues block 834 where editor 168 begins scanning change regions 450 in change list 170.

At block 836, editor 168 checks whether there are more change regions 450 left to be scanned in change list 170. If there are still change regions left, then editor 168 continues to block 840 where it gets the next change region 450 in change list 170. Flow then continues to block 842 where editor 168 determines whether the change that the user has requested is within the current change region. Editor 168 makes its determination by checking whether change boundary 461 of the new PCR, created at block 832, intersects with the region boundary 458 of the change region previously retrieved at block 840. If the change is not within the current change region, then flow goes back to block 836, and change list 170 is thus continued to be scanned. When there are no more change regions 450 left in change list 170 to be scanned and the new change was not in any of the change regions in the change list, editor 168 creates a new change region in change list 170 at block 838. Control then continues block 850 where the pre-commit record entry 459 created at block 832 is added to the current change region's PCR stack 460. Control then continues to block 820 (FIG. 11) as described above.

Referring again to FIG. 12, if the scanning of change list 170 finds that the current change is within a change region 450 at block 842, then editor 168 gets the PCR entry 459 from the top of stack 460 for the current change region at block 844. Flow then continues to block 846 where editor 168 determines whether changes are allowed to be added to this PCR stack entry 459. Only the top PCR is checked because the last user to make changes in this change region has the power to control whether further changes are allowed on top of the last user's changes via change options 406. Editor 168 makes this determination by checking commit mode 463 of the current PCR stack entry 459 and by checking whether the user requesting the current change is the same as user 462. Editor 168 checks user 462 because users are always allowed to make changes over their own changes that they have previously made.

If changes are allowed, then control continues to block 850 as described above. If changes are not allowed to be added to this PCR, then flow continues to block 848 where editor 168 warns the user that changes are not allowed to this change region. Flow then continues to block 824 (FIG. 11) where normal document processing is done. Flow then continues to block 826 where editor 168 determines whether the current user has selected an exit operation. Since in this case the user did not select an exit operation, flow continues to block 830 where editor 168 displays simultaneous view 404 of edit object 174 including all change data 464 as it would appear if change data 464 were to be applied to shared edit object 174, as described above. Flow now returns to block 802.

While this invention has been described with respect to the preferred and alternative embodiments, it will be understood by those skilled in the art that various changes in detail may be made therein without departing from the spirit, scope, and teaching of the invention. For example, groupware may become widely employed in consumer applications such as operator panels for consumer electronics, appliances, and automobiles. Accordingly, the herein disclosed invention is to be limited only as specified in the following claims.

What is claimed is:

1. A collaborative-processing system, comprising:
   a change list that contains pre-commit changes to a shared object for a plurality of users, wherein the pre-commit changes are changes that have been requested by the plurality of users, but wherein the pre-commit changes have not yet been committed to the shared object; and
   a groupware program that creates the pre-commit changes from operations entered by the plurality of users wherein the groupware program further displays a simultaneous view to the plurality of users, wherein the simultaneous view is of the shared object and is of the pre-commit changes as they would appear if they were to be applied to the shared object, and where the groupware program further comprises a save capability that, in response to a save request from one user, commits to the shared object just pre-commit changes made by the one user while leaving other users' pre-commit changes remaining in the change list.

2. The collaborative-processing system of claim 1, wherein the change list further comprises:
   a list of change regions, wherein each change region comprises a stack of pre-commit records, wherein the pre-commit records contain the pre-commit changes.

3. The collaborative processing system of claim 2 wherein each of the change regions contains only pre-commit changes that are dependent on each other.

4. The collaborative-processing system of claim 1, wherein the save request from the one user occurs as a result of the one user exiting an editing session of the shared object.

5. The collaborative-processing system of claim 1, wherein the save request from the one user occurs as a result of the one user requesting a save operation while remaining in an editing session of the shared object.

6. The collaborative-processing system of claim 1 wherein the groupware program further comprises a discard capability that, in response to a discard operation from the one user, discards just the pre-commit changes made by the one user while keeping pre-commit changes made by other users in the change list.

7. The collaborative-processing system of claim 6, wherein the discard operation is an exit without save operation.

8. The collaborative-processing system of claim 6, wherein the discard operation is an erase operation while the one user remains in an editing session of the shared object.

9. A computer system, said computer system comprising:
a bus;
a central-processing unit;
memory, wherein the memory is connected to the central-processing unit via the bus;
a change list, stored in the memory, that contains pre-commit changes to a shared object for a plurality of users, wherein the pre-commit changes arc changes that have been requested by the plurality of users, but wherein the pre-commit changes have not yet been committed to the shared object; and
a groupware program, stored in the memory, for execution on the central-processing unit, wherein the groupware program creates the pre-commit changes from operations entered by the plurality of users, wherein the groupware program displays a simultaneous view to the plurality of users, wherein the simultaneous view is of the shared object and is of the pre-commit changes as they would appear if they were to be applied to the shared object, and where the groupware program further comprises a save capability that, in response to a save request from one user, commits to the shared object just pre-commit changes made by the one user while leaving other users' pre-commit changes remaining in the change list.

10. The computer system of claim 9, wherein the change list further comprises:
a list of change regions, wherein each change region comprises a stack of pre-commit records, wherein the pre-commit records contain the pre-commit changes.

11. The computer system of claim 10, wherein each of the change regions contains only pre-commit changes that are dependent on each other.

12. The computer system of claim 9, wherein the save request from the one user occurs as a result of the one user exiting an editing session of the shared object.

13. The computer system of claim 9, wherein the save request from the one user occurs as a result of the one user requesting a save operation while remaining in an editing session of the shared object.

14. The computer system of claim 9 wherein the groupware program further comprises a discard capability that, in response to a discard operation from the one user, discards just the pre-commit changes made by the one user while keeping pre-commit changes made by other users in the change list.

15. The computer system of claim 14, wherein the discard operation is an exit without save operation.

16. The computer system of claim 14, wherein the discard operation is an erase operation while the one user remains in an editing session of the shared object.

17. A groupware data structure used by a groupware program to manage change operations by a plurality of users to a shared object, comprising:
a pre-commit record stack field comprising a plurality of pre-commit record fields for storing a pre-commit change, wherein the pre-commit change is a change to the shared object that has been requested by one of the plurality of users, but wherein the groupware program has not yet committed the pre-commit change to the shared object;
a region boundary field, wherein the groupware program stores, in the region boundary field, boundary data of an amalgamation of the plurality of pre-commit record fields, wherein the boundary data of the amalgamation describes a boundary of the amalgamation on a display screen; and
a recordable media containing the pre-commit record stack field and the region boundary field.

18. The groupware data structure of claim 17, wherein the pre-commit record field further comprises:
a pre-commit boundary field, wherein the groupware program stores, in the pre-commit boundary field, boundary data for the pre-commit record field, wherein the boundary data for the pre-commit record field describes a bound of the pre-commit record field on a display screen.

19. The groupware data structure of claim 17, wherein the pre-commit record field further comprises:
a user field, wherein the groupware program stores, in the user field an identity of the one user.

20. The groupware data structure of claim 17, wherein the pre-commit record field further comprises:
a commit mode field, wherein the groupware program stores, in the commit field, a mode of immediate, allow changes, and don't allow changes.

21. The groupware data structure of claim 17, wherein the pre-commit record field further comprises:
a discardable flag field for indicating whether the pre-commit record can be discarded.

22. A computer program product that allows a plurality of users to edit a shared object, comprising:
a groupware program that displays a simultaneous view to the plurality of users, wherein the simultaneous view is of the shared object and is of pre-commit changes as they would appear if they were to be applied to the shared object, and wherein the groupware program creates a change list that contains the pre-commit changes to the shared object, wherein the pre-commit changes are changes that have been requested by the plurality of users, but wherein the pre-commit changes have not yet been committed to the shared object, and wherein the groupware program further comprises a save capability that, in response to a save request from one user, commits to the shared object just pre-commit changes made by the one user while leaving other users' pre-commit changes remaining in the change list; and
signal-bearing media bearing the groupware program.

23. The computer program product of claim 22, wherein the change list further comprises:
a list of change regions, wherein each change region comprises a stack of pre-commit records, wherein the pre-commit records contain the pre-commit changes.

24. The computer program product of claim 23, wherein each of the change regions contains only pre-commit changes that are dependent on each other.

25. The computer program product of claim 22, wherein the save request from the one user occurs as a result of the one user exiting an editing session of the shared object.

26. The computer program product of claim 22, wherein the save request from the one user occurs as a result of the one user requesting a save operation while remaining in an editing session of the shared object.

27. The computer program product of claim 22 wherein the groupware program further comprises a discard capability that, in response to a discard operation from the one user, discards just the pre-commit changes made by the one user while keeping pre-commit changes made by other users in the change list.

28. The computer program product of claim 27, wherein the discard operation is an exit without save operation.

29. The computer program product of claim 27, wherein the discard operation is an erase operation while the one user remains in an editing session of the shared object.

30. A method for editing a shared object by a plurality of users, comprising the steps of:
creating a record of pre-commit changes from operations entered by the plurality of users, wherein the pre-commit changes have not yet been committed to the shared object;

displaying a simultaneous view to the plurality of users, wherein the simultaneous view is of the shared object and is of the pre-commit changes as they would appear if they were to be applied to the shared object; and in response to a request from one user, selectively committing to the shared object just certain changes while leaving other pre-commit changes uncommitted.

31. The method of claim 30, wherein the record further comprises:

a list of change regions, wherein each change region comprises a stack of pre-commit records, wherein the pre-commit records contain the pre-commit changes.

32. The method of claim 31, wherein each of the change regions contains only pre-commit changes that are dependent on each other.

33. The method of claim 30, wherein the save request from the one user occurs as a result of the one user exiting an editing session of the shared object.

34. The method of claim 30, wherein the save request from the one user occurs as a result of the one user requesting a save operation while remaining in an editing session of the shared object.

35. The method of claim 30, further comprising: in response to a discard operation from the one user, discarding just the pre-commit changes made by the one user while keeping pre-commit changes made by other users in the record.

36. The method of claim 35, wherein the discard operation is an exit without save operation.

37. The method of claim 35, wherein the discard operation is an erase operation while the one user remains in an editing session of the shared object.

* * * * *

UNITED STATES PATENT AND TRADEMARK OFFICE
CERTIFICATE OF CORRECTION

PATENT NO. : 5,966,512
DATED : Oct. 12, 1999
INVENTOR(S) : Cary Lee Bates and Jeffrey Michael Ryan It is certified that error appears in the above-identified patent and that said Letters Patent is hereby corrected as shown below:

Claim 18, Col. 14, Line 7, "bound" should be --boundary--.

Signed and Sealed this

Twenty-fifth Day of April, 2000

Attest:

Q. TODD DICKINSON

*Attesting Officer*          *Director of Patents and Trademarks*